(12) United States Patent
Nguyen et al.

(10) Patent No.: US 11,556,992 B2
(45) Date of Patent: Jan. 17, 2023

(54) SYSTEM AND METHOD FOR MACHINE LEARNING ARCHITECTURE FOR ENTERPRISE CAPITALIZATION

(71) Applicant: ROYAL BANK OF CANADA, Toronto (CA)

(72) Inventors: Hieu Quoc Nguyen, Toronto (CA); Morris Jamieson Chen, Toronto (CA); Kirtan Purohit, Toronto (CA); Diana-Elena Oprea, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 335 days.

(21) Appl. No.: 16/994,518

(22) Filed: Aug. 14, 2020

(65) Prior Publication Data

US 2021/0049700 A1    Feb. 18, 2021

Related U.S. Application Data

(60) Provisional application No. 62/886,851, filed on Aug. 14, 2019.

(51) Int. Cl.
| | |
|---|---|
| *G06Q 40/06* | (2012.01) |
| *G06K 9/62* | (2022.01) |
| *G06N 3/04* | (2006.01) |
| *G06N 20/20* | (2019.01) |

(52) U.S. Cl.
CPC .......... *G06Q 40/06* (2013.01); *G06K 9/6232* (2013.01); *G06K 9/6264* (2013.01); *G06N 3/049* (2013.01); *G06N 20/20* (2019.01)

(58) Field of Classification Search
CPC .... G06Q 40/06; G06K 9/6232; G06K 9/6264; G06N 3/049; G06N 20/20; G06N 3/0445; G06N 3/08; G06N 5/003; G06N 7/005; G06N 20/10
See application file for complete search history.

(56) References Cited

PUBLICATIONS

Leveraging social media news, Chen et al, 2018 (Year: 2018).*
Deep Learning for Stock Market Prediction, Vargas et al, 2018 (Year: 2018).*
P. Goyal, S. Pandey, K. Jain. Deep Learning for Natural Language Processing. 2018.
V. Iosifidis, E. Ntoutsi. Large Scale Sentiment Learning with Limited Labels. 2017.
(Continued)

*Primary Examiner* — Jianxun Yang
(74) *Attorney, Agent, or Firm* — Norton Rose Fulbright Canada LLP

(57) ABSTRACT

Systems and methods are described in relation to specific technical improvements adapted for machine learning architectures that conduct classification on numerical and/or unstructured data. In an embodiment, two neural networks are utilized in concert to generate output data sets representative of predicted future states of an entity. A second learning architecture is trained to cluster prior entities based on characteristics converted into the form of features and event occurrence such that a boundary function can be established between the clusters to form a decision boundary between decision regions. These outputs are mapped to a space defined by the boundary function, such that the mapping can be used to determine whether a future state event is likely to occur at a particular time in the future.

20 Claims, 32 Drawing Sheets

(56) References Cited

PUBLICATIONS

M. Kusner, Y. Sun, N. Kolkin, K. Weinberger. From Word Embeddings To Document Distances. 2015.
J. Howard, S. Ruder. Universal Language Model Fine-tuning for Text Classification. 2018.
R. Akita, A. Yoshihara, T. Matsubara, K. Uehara. Deep Learning for Stock Prediction using Numerical and Textual Information. 2018.
D. Torres, H. Qiu. Applying Recurrent Neural Networks for Multivariate Time Series Forecasting of Volatile Financial Data. 2018.
J. Rosenbaum, J. Pearl, J. Perella, J. Harris. Investment Banking: Valuation Leveraged Buyouts, and Mergers and Acquisitions. 2013.
J. Alberg, Z. Lipton. Improving Factor-Based Quantitative Investing by Forecasting Company Fundamentals. 2018.
L. Solberg J. Karlsen. The Predictive Power of Earnings Conference Calls (Thesis). 2018.
G. Jacobs, E. Lefever and V. Hoste. Economic Event Detection in Company-Specific News Text. 2017.
Dittmar and A. Thakor. Why Do Firms Issue Equity. 2007.

\* cited by examiner

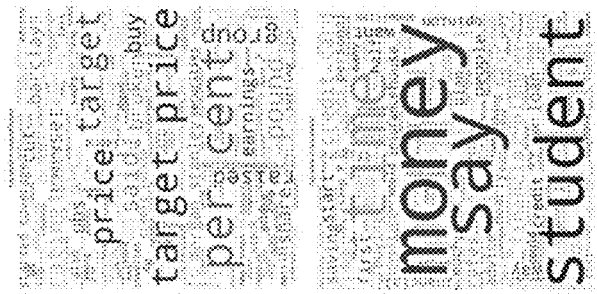
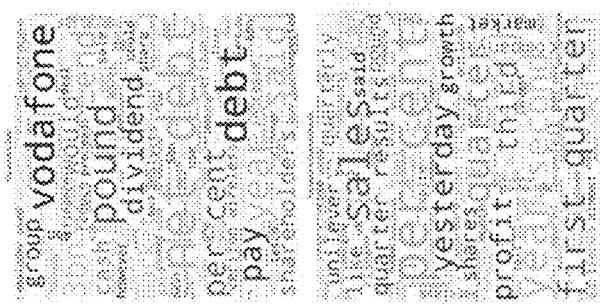
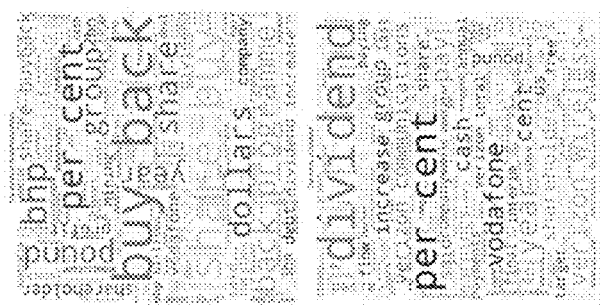
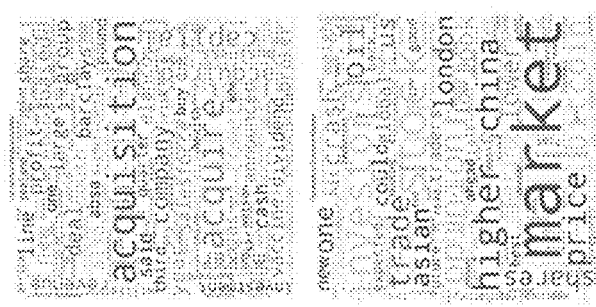
FIG. 13

Testing accuracy 0.8960493827160049
Testing F1 score: 0.8933404622356362

Clasification report:

| | precision | recall | f1-score | support |
|---|---|---|---|---|
| AnalystReports | 0.94 | 0.95 | 0.94 | 76 |
| Debt | 0.73 | 0.73 | 0.73 | 15 |
| Dividend | 0.82 | 0.93 | 0.87 | 43 |
| Economy/Markets | 0.88 | 0.70 | 0.78 | 33 |
| MergerAcquisition | 0.91 | 0.86 | 0.89 | 72 |
| QuarterlyResults | 0.91 | 0.96 | 0.93 | 358 |
| ShareRepurchase | 0.75 | 0.50 | 0.60 | 12 |
| non-relevant | 0.89 | 0.64 | 0.75 | 39 |
| accuracy | | | 0.90 | 648 |
| macro avg | 0.85 | 0.78 | 0.81 | 648 |
| weighted avg | 0.90 | 0.90 | 0.89 | 648 |

FIG. 17

Testing accuracy 0.7565337001375516
Testing F1 score: 0.7657732825296584

Clasification report:

|   | precision | recall | f1-score | support |
|---|---|---|---|---|
| 0 | 0.92 | 0.83 | 0.87 | 433 |
| 1 | 0.76 | 0.93 | 0.83 | 98 |
| 2 | 0.82 | 0.50 | 0.62 | 74 |
| 3 | 0.49 | 0.44 | 0.47 | 54 |
| 4 | 0.40 | 0.17 | 0.24 | 12 |
| 5 | 0.41 | 0.44 | 0.42 | 16 |
| 6 | 0.30 | 0.75 | 0.43 | 40 |
| accuracy |  |  | 0.76 | 727 |
| macro avg | 0.59 | 0.58 | 0.55 | 727 |
| weighted avg | 0.80 | 0.76 | 0.77 | 727 |

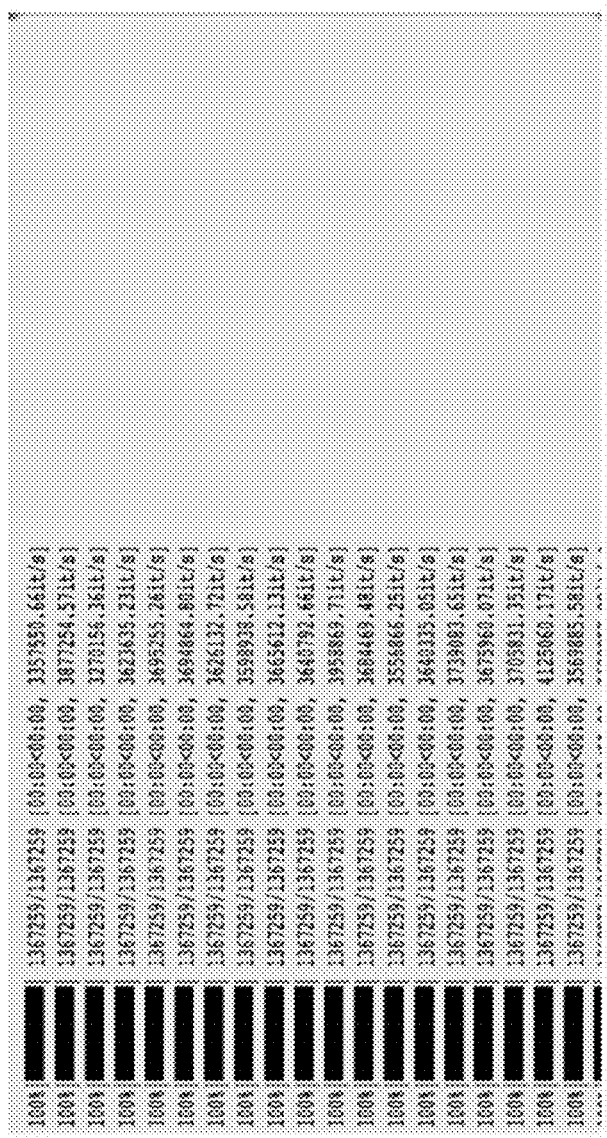
FIG. 19B

```
%%time
logreg = LogisticRegression(C=1e5)
logreg.fit(X_train, y_train)
y_pred = logreg.predict(X_test)

CPU times: user 1min 59s, sys: 24.8 s, total: 2min 23s
Wall time: 2min 38s print('Testing accuracy is' % accuracy_score(y_test, y_pred))
print('Testing F1 score: {}'.format(f1_score(y_test, y_pred, average='weighted')))

Testing accuracy 0.7558079011805702
Testing F1 score: 0.7558217870030726 print('\nClassification report\n', classification_report(y_test, y_pred))

Classification report:
              precision    recall  f1-score   support neg       0.75      0.75      0.75    282742
         pos       0.76      0.76      0.76    303227 micro avg       0.76      0.76      0.76    585969
   macro avg       0.76      0.76      0.76    585969
weighted avg       0.76      0.76      0.76    585969
```

FIG. 20

SYSTEM AND METHOD FOR MACHINE LEARNING ARCHITECTURE FOR ENTERPRISE CAPITALIZATION

CROSS-REFERENCE

This application is a non-provisional of, and claims all benefit, including priority of U.S. Provisional Application No. 62/886,851 filed Aug. 14, 2019, entitled "SYSTEM AND METHOD FOR MACHINE LEARNING ARCHITECTURE FOR ENTERPRISE CAPITALIZATION", incorporated herein by reference in its entirety.

FIELD

Embodiments of the present disclosure generally relate to the field of machine learning, and more specifically, embodiments relate to devices, systems and methods for adapting a machine learning architecture for predicting opportunities from numerical and/or unstructured data.

INTRODUCTION

Predicting capital raising opportunities in the financial industry is difficult as a result of the large volume of data which may be necessary in order to reveal a pattern indicative of capital raising opportunities. The process may be: expensive, as assembling various data from various data sources can be time consuming and cost prohibitive; prohibitively slow, as processing large amounts of data can require a processing time which prevents acting on the identified capital raising opportunities; inaccurate, as the various data sets can be structured or unstructured and difficult to integrate, and extracting the relative importance from the data sets may be difficult to accurately determine; and resource intensive, requiring large amounts of computing power in order to process.

Predicting capital raising opportunities in a faster, more efficient, cheaper, or more accurate manner is desirable.

Accordingly, a technical problem arises in respect of the difficulty in generating meaningful outputs from the data, and a technical solution is desirable in respect of utilizing specific computational approaches that aid in improving the practical tractability of generating outputs from the processing the data.

SUMMARY

Systems and methods are described in relation to specific technical improvements adapted for machine learning architectures that conduct classification on numerical and/or unstructured data. The technical approaches described herein are in respect of a specific improvement using a specific machine learning architecture to solve various technical problems described herein. In an embodiment, a neural network, a first machine learning model, and a second machine learning model are utilized in concert to generate output data sets representative of future entity states, such as requiring capital funding. As noted in further embodiments, the specific machine learning architecture provides significant structural improvements.

The system includes a specific neural network (in some embodiments, two layers of interconnected long short term memory units) which was adapted for processing raw numerical time-series data to generate a future feature data structure representative of a numerical future state characteristic generated from interrelationships tracked in prior time series data.

A two layer interconnected long short term memory unit architecture was found experimentally to yield an increased level of accuracy having acceptable computational performance in situations where there prior time series data timeframe was large (e.g., 30 or 252 days). The first machine learning model is configured to process unstructured textual data (e.g., unstructured textual news data, such as earnings reports, news articles, press releases provided in a text input format) and automatically process the unstructured textual data to establish one or more output data structures representative of (e.g., generating data values) a predicted category/classification, or a classification score (e.g., a listed array of which type of classification is most likely), and a sentiment score. An second learning architecture is trained to cluster prior entities based on characteristics converted into the form of features and event occurrence such that a dichotomy-marking function (e.g., a boundary delineating function) can be established between the clusters to form a decision boundary between decision regions.

The dichotomy-marking function may define one or more solution dichotomies within a plurality of dichotomies defined in part by document descriptions, aggregated sentiment scores, future feature values and future instance values. For example, a plurality of the dichotomies (e.g., vector spaces) may be defined by possible values of document descriptions, aggregated sentiment scores, future feature values and future instance values (e.g., a 5 dimensional vector space). The plurality of the dichotomies may include one or more dichotomies (e.g., vector subspaces). During training, the second learning architecture learns a dichotomy-marking function which delineates one or more solution dichotomies associated with the training data. For example, the training data may be labelled instances where an entity raised capital, and one or more examples of where the entity did not raise capital, and the dichotomy-marking function may mark a boundary in the vector space between the mapped grouping or clustering of training data with labelled instances of raising capital, labelled instances of not raising capital. The one or more solution dichotomies may be dichotomies (e.g., vector spaces) representative of a set of interrelations between the training data which is likely to indicate the entity needed capital (e.g., low stock prices and good positive sentiment may indicate capital funding opportunity), while excluding sets of interrelations between the training data where the entity did not need funding.

The dichotomy-marking function may be a binary function (i.e., either newly ingested data is within the solution dichotomy, or it is not), or it may be multivariate, allowing for many possible solutions (e.g., can determine whether a stock capital funding event, or a debt capital funding event is upcoming, or no capital funding is likely to occur.)

The dichotomy-marking function determines whether inputs are sufficiently related to the one or more solution dichotomies based on, for example, plotting or mapping the solution dichotomy in a vector space and plotting or mapping a representation of the inputs into the same vector space, and determining a relative distance. In example embodiments, the threshold distance is used to determine whether a function is within or outside of the one or more solution dichotomies.

In operation, the neural network receives raw numerical data inputs, such as market data relating to an entity including stock price data, volume data, and moving averages of the same, and can generate an output data structure representing a predicted price moving average for a future timestate. The first machine learning model receives a corpus of textual data such as news data relating to the entity, and generates, in various categories or classifications, one or more aggregated sentiment scores (e.g., one each mapped to features used in the second learning for distinguishing relative to the decision boundary).

These outputs are mapped to a space defined by the dichotomy-marking function, such that the mapping can be used to determine whether a future state event is likely to occur at a particular time in the future. In an embodiment, the future state event can be a request for capital funding (e.g., debt issuance, equity issuance). The decision boundary can be established based on prior entities that have had capital funding events recently where clusters can be formed between those entities that have had capital funding events recently and those that did not. An output data structure from the system can include an automatically generated predictive logit data value, or a normalized data value (e.g., normalized to a probability of occurrence of the event, or normalized to a binary output where the decision threshold is based on a magnitude or a distance away from the decision boundary).

A challenge with large numerical and unstructured data sets is that patterns are difficult to discern as a result of the interrelation between the numerical and unstructured data being unclear. For example, the unstructured data may need classification before it can be ingested to determine underlying patterns within the unstructured data, which in turn may need to be processed to determine a relation between the structured and unstructured data.

Moreover, integrating numerical data with unstructured text data may cause issues as the data sets can be difficult to integrate to provide meaningful insight. For example, a description of a company's business (the unstructured data), such as describing the company as being a residential real estate developer, may not provide clarity or insight into determining a stock price of the company (numerical data), unless the company's business is understood to depend on news and stock prices of companies that provide borrowing facilities to residential real estate purchasers, and so forth.

This challenge is especially difficult to overcome if there is a large volume of data, such as numerical time-series data and unstructured textual news data coming from a periodic data stream. First, patterns which are visible when all or most of the data is ingested, can become invisible as a result of selective ingesting in response to large volumes of data. Second, some patterns may only be revealed through a plurality of features, and discovering candidate patterns and tracking the plurality of features in large volumes of numerical and unstructured data can be computationally infeasible, cost prohibitive, and so forth. Third, some patterns may only become apparent when presented with large enough volumes of data, thereby requiring implicitly the two challenges referred to above in addition to requiring the means to retrieve sufficient information.

In a non-limiting example, investment bankers, in determining future entity states, are facing an overload of numerical and unstructured data coming from a myriad of various financial terminals: Bloomberg™, SNL™, S&P™, Factset™, Dealogic™, Thomson Reuters™, to name a few. Investment bankers use these terminals to continuously track the market in order to spot potential deals for their employer or their clients. However, trends may be obscured both in the volume of data, and possible trends may be too difficult to follow as a result of the new volume of data being received. These terminals are also very expensive, and a scarce resource.

The technical challenge associated with the proposed system includes ingesting the one or more numerical time-series data efficiently in light of the fact that the one or more numerical time-series data may exhibit long-term dependency with slow decay or extreme long-term dependency was slow decay. For example, attempting to computationally process all data points associated with a specific market may be resource prohibitive, or may take so long to process that the determined pattern may have ended.

Another technical challenge associated with the proposed system includes a computational resource efficient approach to filtering the received one or more numerical time-series data and the one or more unstructured textual news data. For example, the news data sets may come in a variety of formats, including various information such as a date, a header, a stock price, option price, and so forth. Filtering said news data sets into a normalized format which is interpretable by the first machine learning model, or natural language processing model, is a technical challenge.

Moreover, designing a means to convey the patterns, which as discussed above are based on a plurality of features, which is intuitive, easily understood, in a user friendly navigable platform is a technical challenge. For example, where a pattern is extracted from the news data sets, determining how to extract the pattern, and how to advise a user of the pattern quickly is a difficult technical challenge. In a non-limiting example embodiment, a user navigation which tracks multiple features may be confusing or simply overwhelm the user.

One approach to processing documents to predict subsequent events includes processing the words of a document sequentially. A technical challenge associated with processing the one or more historical unstructured textual news data sets includes extracting meaningful interrelations between sequentially processed words, and distant words. For example, how word interrelationships are categorized has an impact on the predicted subsequent event. Continuing the example, where word meaning is overly represented by the word position within a document, or the word frequency within a document, the resulting predicted subsequent event may be substantively meaningless (e.g., the next event is likely a financial event (the most commonly occurring words in a financial news document) vs the next event is likely a debt issuance (a more nuanced interpretation).

A further technical challenge associated with processing documents includes representing words within documents in a consistent manner which provides reliable and accurate results. For example, a process whereby words within documents are encoded in such a manner such that certain nuance is removed from the resulting text or document representation, making the resulting text or document representation non-descriptive, is undesirable.

Another technical challenge processing the one or more unstructured textual news data also includes dealing with the ambiguity in words. For example, the document describing a particular company receiving funding may be interpreted as either (1) the company needing access to cash as a result of low reserves or low sales, or (2) as a sign of faith from investors that the company will be able to repay, or put to use, the received funding. As a result, processing the one or more historical unstructured textual news data sets may not only include understanding semantic relationships between the words in the document, but also include finding additional interrelations between the document itself in the context or the environment which created the document.

A further technical challenge associated with processing financial news and numerical time-series data includes a lack of labelled training data, and the difficulty in labelling existing data. The lack of labelled training data, and the difficulty in labelling existing data (financial news may be classified by different practitioners as indicative of different phenomena) is particularly problematic when dealing with large volumes of data, as the first machine learning models may over fit to small sample of labelled data.

Finally, one technical challenge associated with numerical and unstructured data is that, where separate data sets are used to extract separate pattern insights, combining various architectural features efficiently is difficult. For example, integrating an identified pattern from a numerical time-series data with a separate pattern identified in unstructured textual news data introduces efficiency challenges.

As described herein in various embodiments, machine learning, and specific machine learning architectures, are utilized that analyze, forecast, or detect anomalies or patterns in financial data (transactional data or news data or otherwise), and in further embodiments, natural language processing methodologies are utilized to identify indicators associated with market events. These outputs can be utilized, for example, to train a mechanism to detect potential capital funding opportunities in a second fashion.

In one example embodiment, the proposed system includes a machine learning data algorithm which receives one or more numerical time-series data and generates one or more financial transaction trend data structures, a natural language processing model which receives one or more historical unstructured textual news data sets and classifies the one or more unstructured textual news data sets into one or more capital intensive event types, and an second learning machine learning engine to receive the one or more financial transaction trend data structures, and the one or more capital intensive event types and determine predicted future entity states.

The described embodiments may discern patterns that are difficult to discern from numerical and unstructured data sets by processing the unstructured data sets into a vector representation that can be compared to, or mapped alongside, the numerical data sets. For example, the natural language processing methodologies may identify vector representation indicators which are associated with capital funding opportunities.

The described embodiments may classify the ingested unstructured data sets (e.g., the unstructured textual news data sets), into predefined category types indicative of capital funding opportunities, and furthermore the ingested unstructured data sets may be analysed with a sentiment analyser to determine whether the user is positive or negative. In this way, the described embodiments may facilitate the integrating of the unstructured news data sets and the numerical data sets by determining a degree of positivity or negativity associated with the type of capital event types identified within the news data sets.

In example embodiments, the described embodiments may overcome the technical challenge associated with a large volume of data by dimensionally reducing the unstructured textual news data sets, or annotating the unstructured textual news data sets to indicate the most relevant terms, or generating a document annotation. In this way, the described embodiments may effectively reduce the amount of data ingested by the system, thereby alleviating some issues associated with the large data sets.

The described embodiments may, as a result of reducing the dimensionality unstructured textual news data sets, or as a result of determining an outlier threshold for the financial trend data structure, process the large financial data set in a timely manner, allowing for an investment banker to review relevant information in time to act on the retrieved data.

The technical challenge of numerical time-series data exhibiting long-term dependency may be overcome by the described embodiments and the use of long term filter being applied to the numerical time-series data. For example, the filter may be a moving 30 day or 252 day filter to process the numerical time-series data and long-term dependency may become more apparent.

The technical challenge associated with processing documents to predict subsequent events may be at least in part overcome by the described embodiments by mapping vector representations of the words in unstructured textual news data sets to a word semantic interrelation vector space. For example, by mapping the words in the documents to the semantic interrelation vector space, word frequency as a determining factor of the word importance may be diminished.

The described embodiments may, as a result of implementing a sentiment analyser, be able to overcome the technical challenge of determining the meaning from ambiguous statements within unstructured textual news data sets. For example, the sentiment analyser may be pre-trained to determine a degree and the type (e.g., positive or negative) of sentiment associated with the ambiguous statements, reducing their ambiguity. The sentiment can be provided into a classifier. For example, for each news article, cumulative sentiment can be determined, such that, for example, each sentence has a label and a score.

The described embodiment's reliance upon a second machine learning model to determine potential capital funding opportunities may relieve the technical challenge associated with the lack of labelled training data. The second machine learning model may be able to learn a solution space based on limited training data which is robust and avoids overfitting.

Specifically, some embodiments described herein relate to architectures for machine learning and natural language processing, including, the use of recurrent neural networks (RNN) operating conjunction with long short-term memory architecture (LSTM). Validation of the results is provided in the figures, indicating an improved level of accuracy and an improved f1 score. Second machine learning approaches, such as the one class support vector machine and isolation forest mechanisms are described in further embodiments.

The system can be utilized to generate visual elements on one or more graphical user interfaces, including graphs and other visual elements thereof, and the machine learning and natural language processing aspects can be utilized to be trained in relation to data representative of historical ownership, news sentiments, and expert insights, among others. For example, there may be an assumption that most companies are in a good place if they are issuing equities, and earning calls information may be automatically parsed to identify opportunities. If a detected signal hits the abnormal level, a notification with top news related to stock price event, including, for example, stock price, volume—calculated moving average (MA) of price, and of volume may be generated that can be provided to a long short term memory based neural network to generate one or more output data structures capturing various forecasts.

The system may be configured to detect anomalies. For example, if a predicted stock price value is greater than 2 standard deviations from a predicted mean, or mean square errors are indicated as less than 0.0001, the system may detect an anomaly.

The approach can evaluate data representative of news and sentiment using techniques such as stochastic gradient classification, linear support vector machine, for classification of text into different categories (e.g., seven different categories). Analyst rating opinions may be processed, and may include, for example, merger/acquisition information, dividend info, share buyback, debt announcements, etc.

The system may have applications, for example, in respect of wealth management, capital markets, stocks, loans, mergers and acquisitions, etc., among others.

In one aspect a computer implemented system for future entity states includes one or more computer processors operating in conjunction with a computer memory and non-transitory computer readable media. The one or more processors are configured to receive numerical time-series data relating to an entity including a plurality of feature data structures, each feature data structure including a feature value and an instance value, and receive unstructured textual news data relating to the entity including one or more documents having one or more words. The one or more processors are configured to process the numerical time-series data to generate averaged numerical time series data exhibiting long term dependencies, and to maintain a neural network trained to generate a future feature data structure having a future feature value and a future instance value for numerical time-series data. The neural network includes a first RNN layer and a second RNN layer, and the first RNN layer is configured to receive the numerical time-series data and the averaged numerical time series data and to transform one or more feature data structures within the received numerical time-series data and one or more feature data structures of the received averaged numerical time-series data into a latent feature representation, and the second RNN layer is configured to receive the latent feature representation and trained to transform the received latent feature representation into the future feature value and the future instance value. The one or more processors are configured to maintain a first machine learning model trained to generate document descriptions and extract sentiment from the unstructured textual news data, where the first machine learning model is configured to receive the unstructured textual news data and trained to generate a vectorized representation of each document within the unstructured textual news data by structuring the vectorized representation with a term frequency and inverse document frequency (TF-IDF) value for each unique word within each document. The first machine learning model is trained with a mapping function interrelating vector representations and document descriptions, and configured to generate a document description of each document of the unstructured textual news data based on the mapping function and the generated vectorized representation. The first machine learning model generates, from the unstructured textual news data, with a pre-trained heuristic sentiment analyzer, a sentiment score for each document in the unstructured textual news data, aggregates the sentiment score into an aggregated sentiment score for the unstructured textual news data relating to the entity. The one or more processors are configured to maintain the second machine learning model having a trained dichotomy-marking function, the trained dichotomy-marking function trained to define one or more solution dichotomies within a plurality of dichotomies defined in part by document descriptions, aggregated sentiment scores, future feature values and future instance values. The second machine learning model is configured to receive the aggregated sentiment score, the document description, the future feature value and the future instance value, and determine whether the aggregated sentiment score, the document description, the future feature value and the future instance value map onto the one or more solution dichotomies. The computer processor is further configured to generate one or more future entity state data structures having the future entity states associated with the one or more solution dichotomies in response to determining the aggregated sentiment score, the document description, the future feature value and the future instance value map onto the one or more solution dichotomies.

In example embodiments, the first RNN layer and the second RNN layer are long short-term memory (LSTM) layers, with the first RNN layer having a long term state representation and a hidden state representation. The first RNN layer is configured to transform one or more feature data structures within the numerical time-series data and one or more feature data structures of the averaged numerical time-series data into a first state representation, and in response to determining the long term state representation should be forgotten based on the first state representation and the hidden state representation, update the long term state representation. The first RNN layer, in response to determining the first state representation and the hidden state representation should be added to the long term state representation, updates the updated long term state representation. The first RNN layer determines the latent representation based on combining the updated updated long term state representation and the first state representation and the hidden state representation, and outputs the latent state representation. The second RNN layer has a second long term state representation, and a second hidden state representation. The second RNN layer is configured to transform the latent representation into a second state representation, and in response to determining the second long term state representation should be forgotten based on the second state representation and the second hidden state representation, update the second long term state representation. The second RNN layer, in response to determining the second state representation and the second hidden state representation should be added to the second long term state representation, updates the updated second long term state representation, and determines the future feature value and the future instance value based on the updated updated second long term state representation and the second state representation and the second hidden state representation. The second RNN layer outputs the future feature value. In example embodiments, the first RNN layer and the second RNN layer include 65 neurons, and are tuned with: a learning rate of 0.01, a Lambda 12 regularization parameter of 0.003 and a gradient clipping parameter of 2.5, an Adam optimization function, and a ReLu activation function.

In example embodiments, the neural network further determines a tolerance interval associated with the numerical time-series data, and generates an alert in response to determining that the future instance value does not satisfy the determined tolerance interval.

In example embodiments, the first machine learning model generates the vectorized representation of each document within the unstructured textual news data by structuring the vectorized representation with a term frequency and inverse document frequency (TF-IDF) of each unique bigram and unigram in each document in the unstructured textual news data. The mapping function is trained to interrelates vector representations of unigrams and bigrams with document descriptions, and the first machine learning model generates the document description of each document of the unstructured textual news data based on the mapping function interrelating vector representations of unigrams and bigrams with document descriptions and the generated vectorized representation.

In example embodiments, the first machine learning model includes a plurality of mapping functions for interrelating vector representations with document descriptions. The first machine learning model generates a plurality of document descriptions of each document of the unstructured textual news data based on each of the plurality of mapping functions, and aggregates the plurality of generated document descriptions into the document description. In example embodiments, the plurality of mapping functions comprises five mapping functions, and the first machine learning model generates five document descriptions of each document of the unstructured textual news data based on each of the five mapping function. The first machine learning model aggregates the five generated document descriptions into the document description.

In example embodiments, the one or more processors further configured to receive a second data set having a second numerical time series data or a second unstructured textual data. In these embodiments, the dichotomy-marking function further defines one or more entity features related to the second data set which are associated with the one or more future entity states, and the relatedness of one or more input entity features, which include the second data set, is determined by the first machine learning model.

In example embodiments, the mapping function interrelates vector representations with document descriptions indicative of an irrelevant news data, and the first machine learning model is configured to discard the unstructured textual news data associated with document descriptions indicative of the irrelevant news data.

In example embodiments, the first machine learning model is trained with a learned probability distribution of predicting paragraph representations from randomly-sampled words within paragraphs. The first machine learning model is configured to generate one or more paragraph descriptions for each document based on the learned probability distribution, and the pre-trained heuristic sentiment analyzer extracts the sentiment score based on the generated one or more paragraph descriptions.

In example embodiments, the numerical time series data is a stock price, and a trading volume, the averaged numerical time series data is a 30 day averaged or a 252 day averaged stock price, and a 30 day averaged or a 252 averaged trading volume, the future instance value is a predicted 30 day averaged or a predicted 252 day averaged stock price, the document description is a topic, the sentiment score is a normalized sentiment score, the one or more future entity states include likely to raise funds state and a likely to issue debt state.

In another aspect, a method for visualizing future entity states includes the steps carried out in the first aspect set out above.

In another aspect, a non-transitory computer readable medium stores machine interpretable instructions, which when executed by a processor, cause the processor to execute a method for visualizing future entity states. The method includes receiving numerical time-series data relating to an entity including a plurality of feature data structures, each feature data structure including a feature value and an instance value and receiving unstructured textual news data relating to the entity including one or more documents having one or more words. The method includes processing the numerical time-series data to generate averaged numerical time series data exhibiting long term dependencies, and maintaining a neural network trained to generate a future feature data structure having a future feature value and a future instance value for numerical time-series data. The neural network maintained in the method includes a first RNN layer and a second RNN layer, and the first RNN layer is configured to receive the numerical time-series data and the averaged numerical time series data and to transform one or more feature data structures within the received numerical time-series data and one or more feature data structures of the received averaged numerical time-series data into a latent feature representation. The second RNN layer is configured to receive the latent feature representation and trained to transform the received latent feature representation into the future feature value and the future instance value. The method includes maintaining a first machine learning model trained to generate document descriptions and extract sentiment from the unstructured textual news data, where the first machine learning model configured to receive the unstructured textual news data and trained to generate a vectorized representation of each document within the unstructured textual news data by structuring the vectorized representation with a term frequency and inverse document frequency (TF-IDF) value for each unique word within each document. The first machine learning model is trained with a mapping function interrelating vector representations and document descriptions, and is configured to generate a document description of each document of the unstructured textual news data based on the mapping function and the generated vectorized representation. The first machine learning model generates, from the unstructured textual news data, with a pre-trained heuristic sentiment analyzer, a sentiment score for each document in the unstructured textual news data. The first machine learning model aggregates the sentiment score into an aggregated sentiment score for the unstructured textual news data relating to the entity. The method includes maintaining a second machine learning model trained with a dichotomy-marking function, the second machine learning model trained to define one or more entity features associated with one or more future entity states with the dichotomy-marking function by evaluating one or more training entity features associated with one or more training future entity states to learn the dichotomy-marking function. The second machine learning model is configured to receive the aggregated sentiment score, the document description, and the future instance value into one or more input entity features, and determine whether the one or more input entity features are sufficiently related to the one or more entity features associated with one or more future entity states defined by the dichotomy-marking function. The method includes generating one or more visual representations associated with the one or more future entity states in response to the received one or more entity features being sufficiently related to the one or more entity features associated with one or more future entity states defined by the dichotomy-marking function.

DESCRIPTION OF THE FIGURES

In the figures, embodiments are illustrated by way of example. It is to be understood that the description and figures are only for the purpose of illustration and as an aid to understanding.

Embodiments will now be described, by way of example only, with reference to the attached figures, wherein in the figures:

FIG. 13 is a set of drawings indicating the most correlated words to each document description based on chi-squared test for an example news data set, according to some embodiments;

FIG. 17 is an example graph of the performance of an example TF-IDF classifier, according to some embodiments;

FIG. 18 is an example graph of the performance of an example classifier utilizing a pre-existing word semantic interrelationship vector space, according to some embodiments;

FIGS. 19A and 19B are diagrams including pseudocode for training Doc2Vec with genism, according to some embodiments;

FIG. 20 shows an example graph of the performance of an example Doc2Vec word vectorizer and example pseudocode, according to some embodiments;

DETAILED DESCRIPTION

Figure 1:
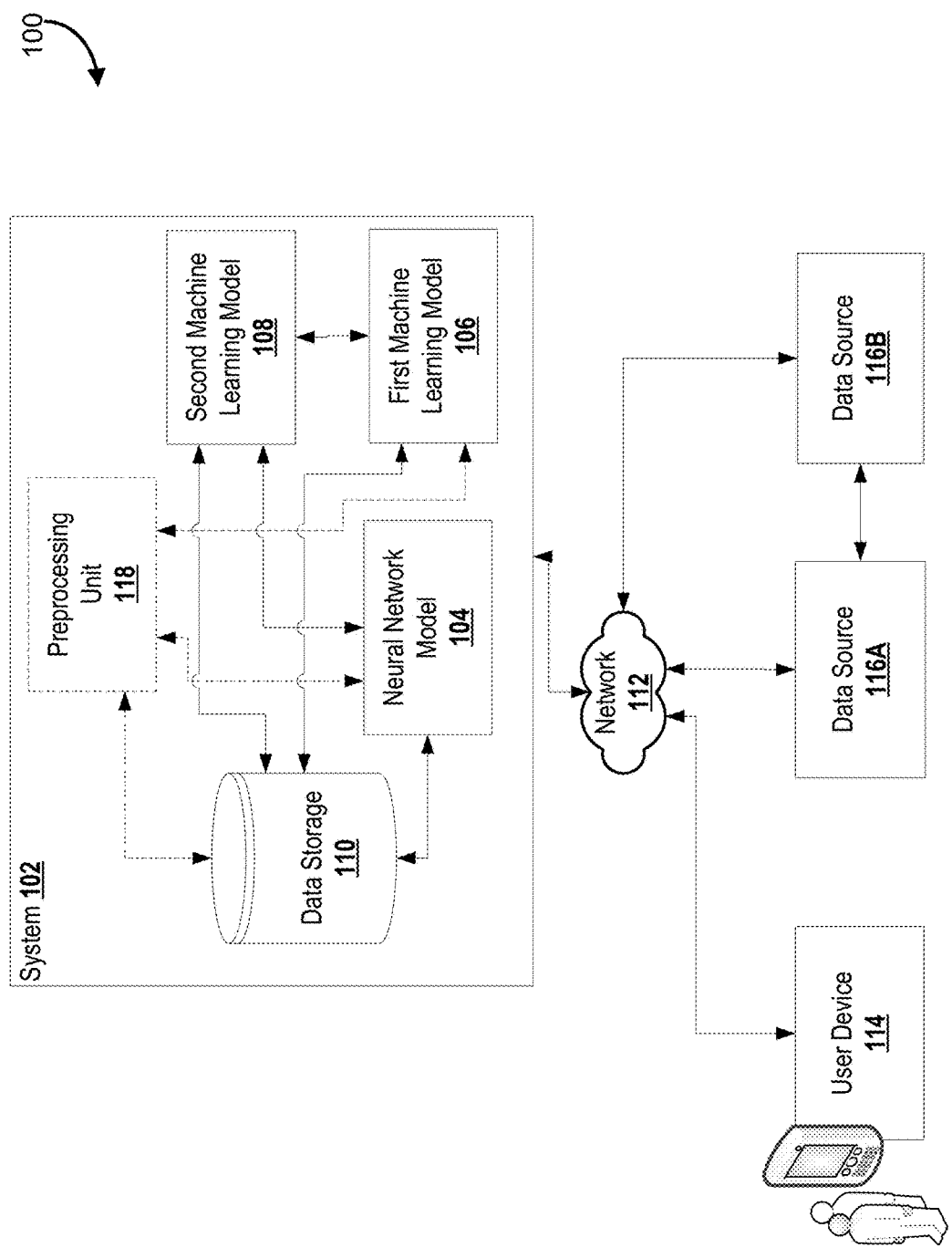
FIG. 1 is an example block schematic for a system for automatically generating future entity states, according to some embodiments.

Systems and methods are described in relation to specific technical improvements adapted for machine learning architectures that conduct classification of numerical and/or unstructured data. Corresponding computing devices, computer readable media (e.g., non-transitory computer readable mediums storing machine-interpretable instruction sets for execution on processors) that operate in conjunction with data storage, computer processors and computer memory are provided.

The disclosed system may extract relevant signals from various financial data sources (e.g., unstructured news data and transaction data) to predict if companies will need capital funding in the future. In order to make such predictions, a neural network (e.g., natural language processor), a first machine learning model, and a second machine learning model are applied on both structured numerical and unstructured textual news data (financial fundamentals, news, press releases, earning calls, etc.).

These techniques consist of deep multivariate recurrent neural networks with long-short term memory (LSTM), advanced Doc2Vec & term frequency—inverse document frequency (TF-IDF) vectorization, stochastic gradient descent & linear support vector machine multi labels classifiers.

The first machine learning models are able to make time series forecasting with Mean Square Error (MSE) of less than 0.001 on a test sample; the neural networks are able to extract and correctly classify text into 7 categories with accuracy of 91.134% and f1 score of 0.91280. The results generated by the techniques are input for Naïve Bayes Inference algorithms to output the probability of whether a company will need capital in the future.

A graphical user interface may be generated based on the transformed data structures, such as an internal dashboard which runs on numerous data science models. The dashboard can offer two functions, among others: aggregation and insights. Live data can be obtained through various interfaces with external or internal data sources, and the live data can include analyst estimates, share ownership, stock prices, and comparable tables, among others.

As described herein in various embodiments, machine learning, and specific machine learning architectures, are utilized that are configured to analyze, forecast, or detect anomalies or patterns in the data, and in further embodiments, natural language processing methodologies are utilized to identify indicators associated with market events.

These outputs can be utilized, for example, to train a mechanism to detect potential capital funding opportunities in a second fashion.

Specifically, some embodiments described herein relate to architectures for machine learning and natural language processing, including, the use of recurrent neural networks (RNN) operating or long short-term memory architecture (LSTM). Validation of the results is provided in the figures, indicating an improved level of accuracy and an improved f1 score. Machine learning or neural network approaches, such as a stochastic gradient descent classifier, and the one class support vector machine and isolation forest mechanisms are described in further embodiments.

The machine learning mechanisms, in a non-limiting example, can be used with optimizing/innovating a process by trying to predict when companies will be going to market to refinance their debt and also to aggregate this volume of data in one point of contact.

Based on the research, there are some interesting factors that play an important role in determining the timing of companies, for example, for determining the timing of when companies are going to raise more capital through equity issuance, or determining when companies are going to raise more capital through equity issuance.

These include the number stock price performance, company's ability to outperform analysts' estimates, number of buy recommendations over number of sell recommendations, consistent increase in holding position of top institutional investors/insiders, etc. Some or all of these factors need to be effectively captured and projected into the future so that investment bankers can make better and sound decisions in terms of timing to contact clients and discuss potential capital funding opportunities.

FIG. 1 shows an example block schematic 100 for a system 102 for automatically generating future entity states, according to some embodiments.

Block schematic 100 includes the system 102, network 112, a user device 114 (optional), and data sources 116.

Data source(s) 116 may include one or more data sources which provide numerical or unstructured data to the system 102 via network 112. For example, in block schematic 100, data source(s) 116 are shown as including data source 116A, and data source 116B. Data source(s) 116 provide the system 102 with numerical time-series data including a plurality of feature data structures having a feature value (e.g., stock prices, stock trading volumes, option and derivative information, financial records, financial fundamentals, and so forth), and an instance value (e.g., a time or date associated with the feature value) alternatively referred to herein as numerical data. Data source(s) 116 also provide the system 102 with unstructured textual news data including one or more documents having one or more words, such as news, press releases, earning calls, and so forth, alternatively referred to herein as news data. Data source(s) 116, for example, can include financial terminals such as Bloomberg™, SNL™, S&P™, Factset™, Dealogic™, Thomson Reuters™, which provide numerical and unstructured data.

Various combinations of data source(s) 116 may provide various combinations of numerical and unstructured data. For example, data source 116A may provide stock prices to the system 102, while data source 116B may be configured to provide the news articles to system 102. In example embodiments, a single data source 116 provides all of the financial data to the system 102.

In another non-limiting example, the data source(s) 116 may include over 7 million data samples ranging from news articles, stock quotes, earnings transcripts, historical ownership, analyst estimates and so forth. The data source(s) 116 provide a combination of both numerical and unstructured textual data, including the data source(s) 116 and data sets and properties as set out below:

Stock Price Volume—Source: Eikon API:
Timeframe: 01/01/2010-17/05/2019
Frequency: Daily
Exchange: TSX
Number of Sectors/Industries: 22
Number of companies: 246 (Including indices)
Features: Date, Open/Close Price, Close Volume, Daily High/Low
Data type: Numerical
News—Source: Eikon API
Timeframe: 01/01/2015-17/05/2019
Frequency: 100 items per company
Exchange: TSX
Number of Sectors/Industries: 82
Features: Date, Headlines, Body, Author
Total number of headlines: 8200
Format: json
Paired: No
News with sentiment labels—Source: Two Sigma Kaggle Competition
Timeframe: 01/01/2007-30/12/2016
Frequency: Intraday
Exchange: US Stock Exchange (Nasdaq, SP500, etc.)
Features: Timestamp, Headlines, Author, Sentiment Classes (−1,0,1)
Total number of headlines: 6.2 Million
Paired: Yes, sentiment
Format: csv
Economic Event News
Timeframe: 01/01/2007-30/12/2016
Frequency: Intraday
Exchange: US Stock Exchange (Nasdaq, SP500, etc.)
Features: Timestamp, Headlines, Economic Classes (QuarterlyResults, AnalystRatings, MergerAcquisition, BuybackOrDividend, Debt)
Paired: Yes, economic events
Format: json
Press Releases Earning Calls—Bloomberg Terminal
Timeframe: LTM as of 30/04/2019
Industries: Energied Materials
Format: html, pdf
Source: Manually download from Bloomberg Terminal
Analyst Estimate—Eikon API
Timeframe: as of 30/04/2019
Exchange: TSX
Number of companies: 241
Features: Date, Firm, Price Target, Recommendation
Format: csv
Historical Ownership—Eikon API
Timeframe: Past 10 periods (quarters) as of 30/04/2019
Exchange: TSX
Number of companies: 241
Features: Date, Firm, Shares Holding, Holding Percentage, Share Change
Format: csv
Comparable Table—Eikon API
Timeframe: LTM as of 30/04/2019
Exchange: TSX
Number of companies: 241
Features: Key Fundamentals, Financial Ratios
Format: csv
C-suite Profile—Eikon API
Timeframe: LTM as of 30/04/2019

Exchange: TSX
Number of companies: 241
Features: Top insiders holding and changes
Format: csv
Company Profile—Eikon API
Timeframe: LTM as of 30/04/2019
Exchange: TSX
Number of companies: 241
Features: Key description of the business
Format: csv Communication network 112 may include a packet-switched network portion, a circuit-switched network portion, or a combination thereof. Communication network 112 may include wired links, wireless links such as radio-frequency links or satellite links, or a combination thereof. Communication network 112 may include wired access points and wireless access points. Portions of communication network 112 could be, for example, an IPv4, IPv6, X.25, IPX or similar network. Portions of network 112 could be, for example, a GSM, GPRS, 3G, LTE or similar wireless networks. Communication network 112 may include or be connected to the Internet. When communication network 112 is a public network such as the public Internet, it may be secured as a virtual private network.

The user device 114 may include one or more devices, of one or more types, capable of receiving information from, and providing information to, the system 102 via the communication network 112. For example, a client device 114 (not shown) may be a desktop or laptop computer, a mobile device, a tablet computer, and so forth.

In example embodiments system 102 includes a preprocessing unit 118.

Figure 2:
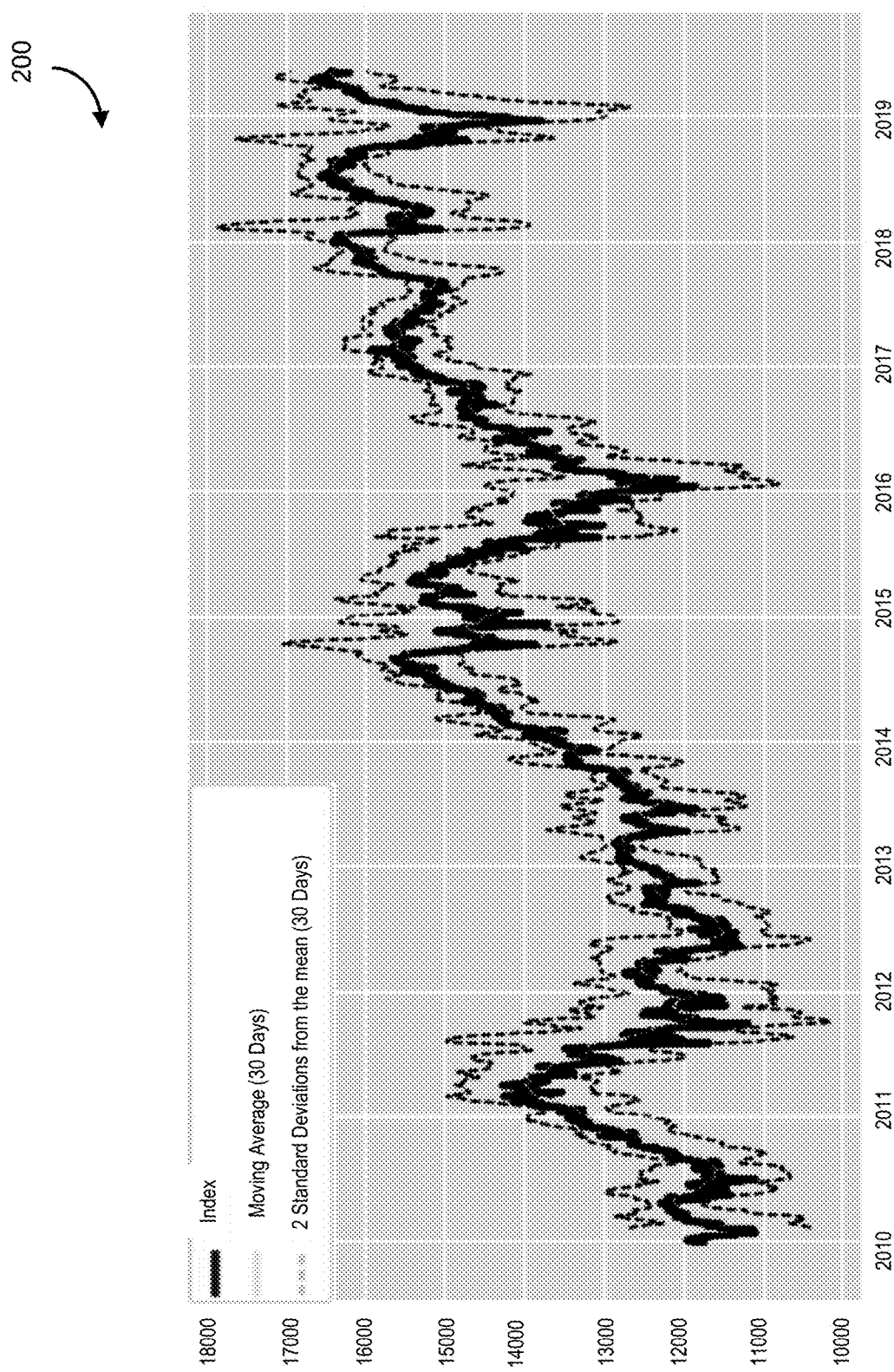
FIG. 2 is a graph showing the 10-year TSX Index and the 10-year TSX Index based on an example filter, according to some embodiments.
Figure 3A:
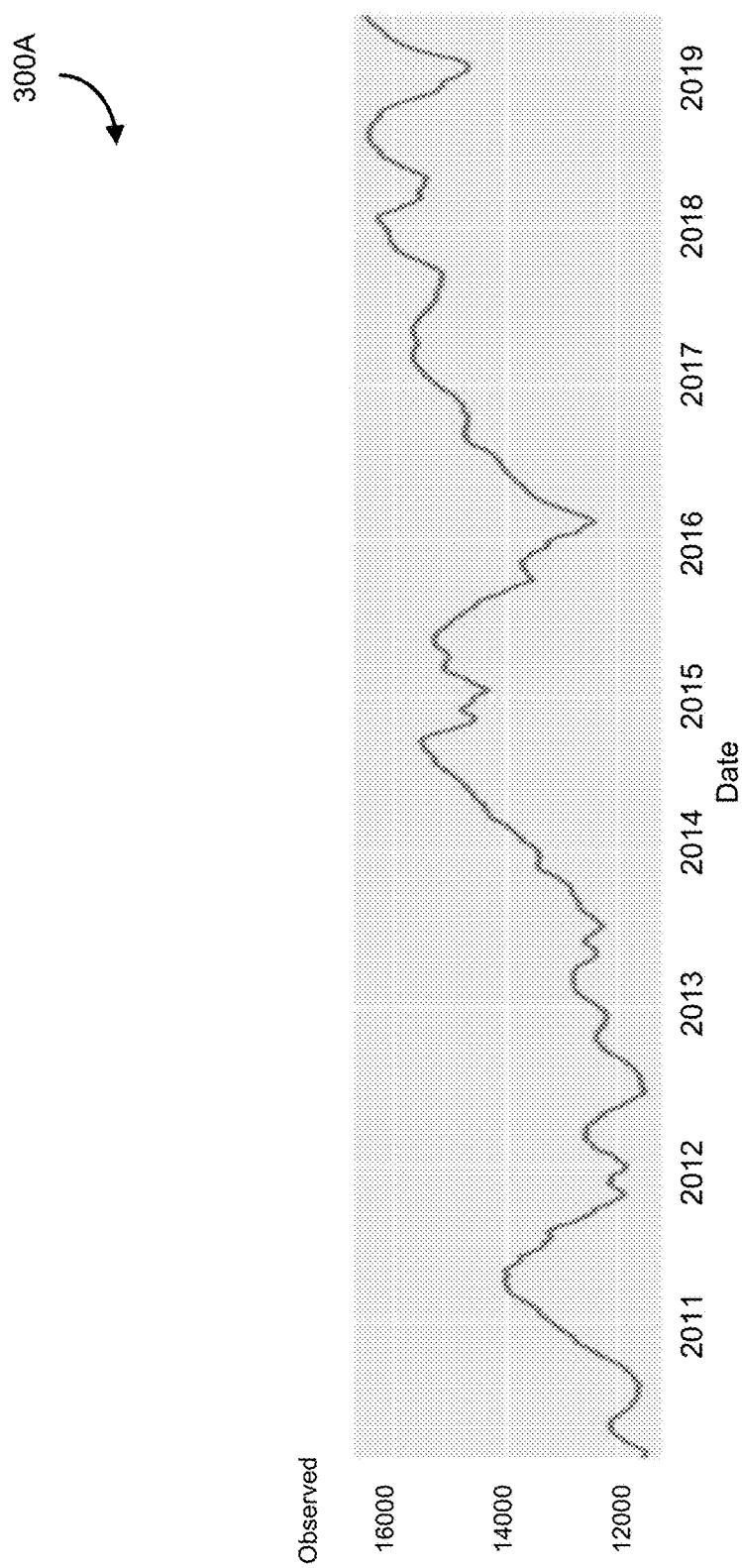
FIGS. 3A-3D are a set of graphs showing various decompositions of the graph in FIG. 2, according to some embodiments.
Figure 3B:
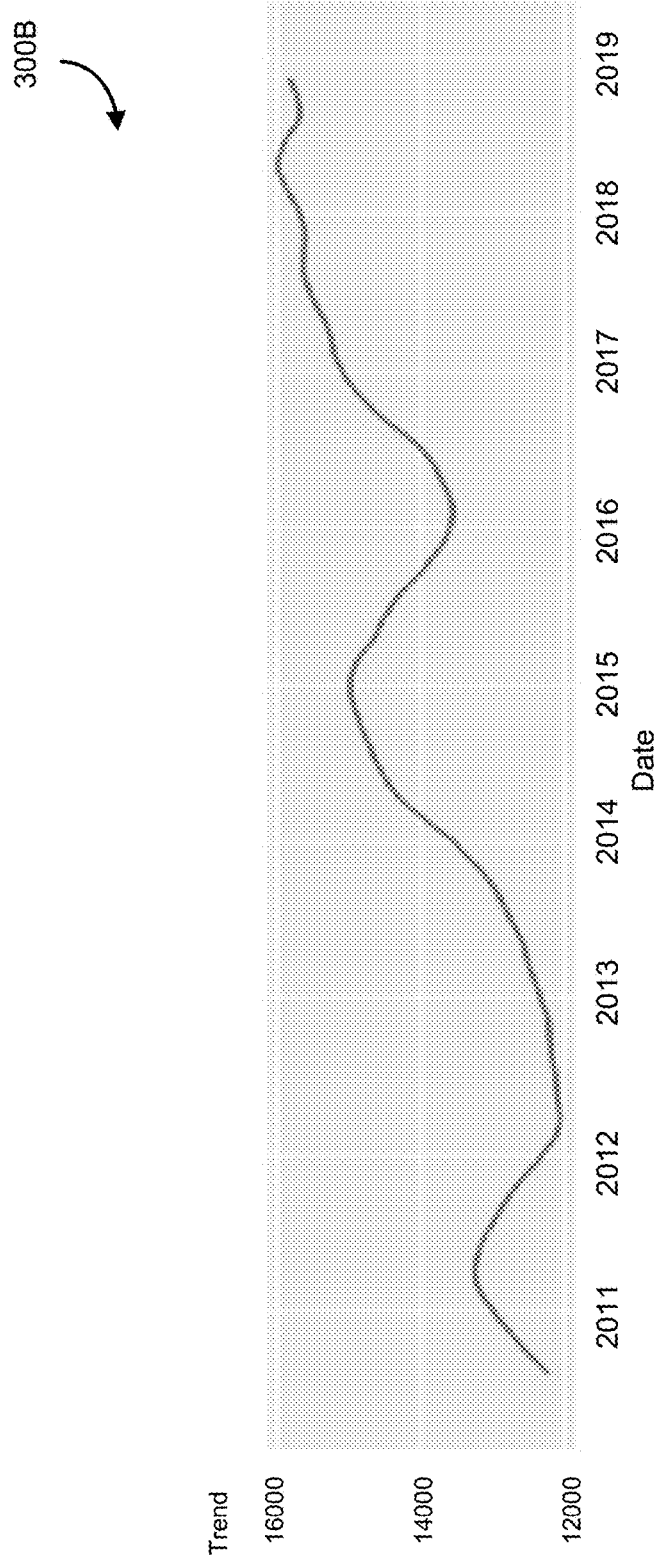
Figure 3C:
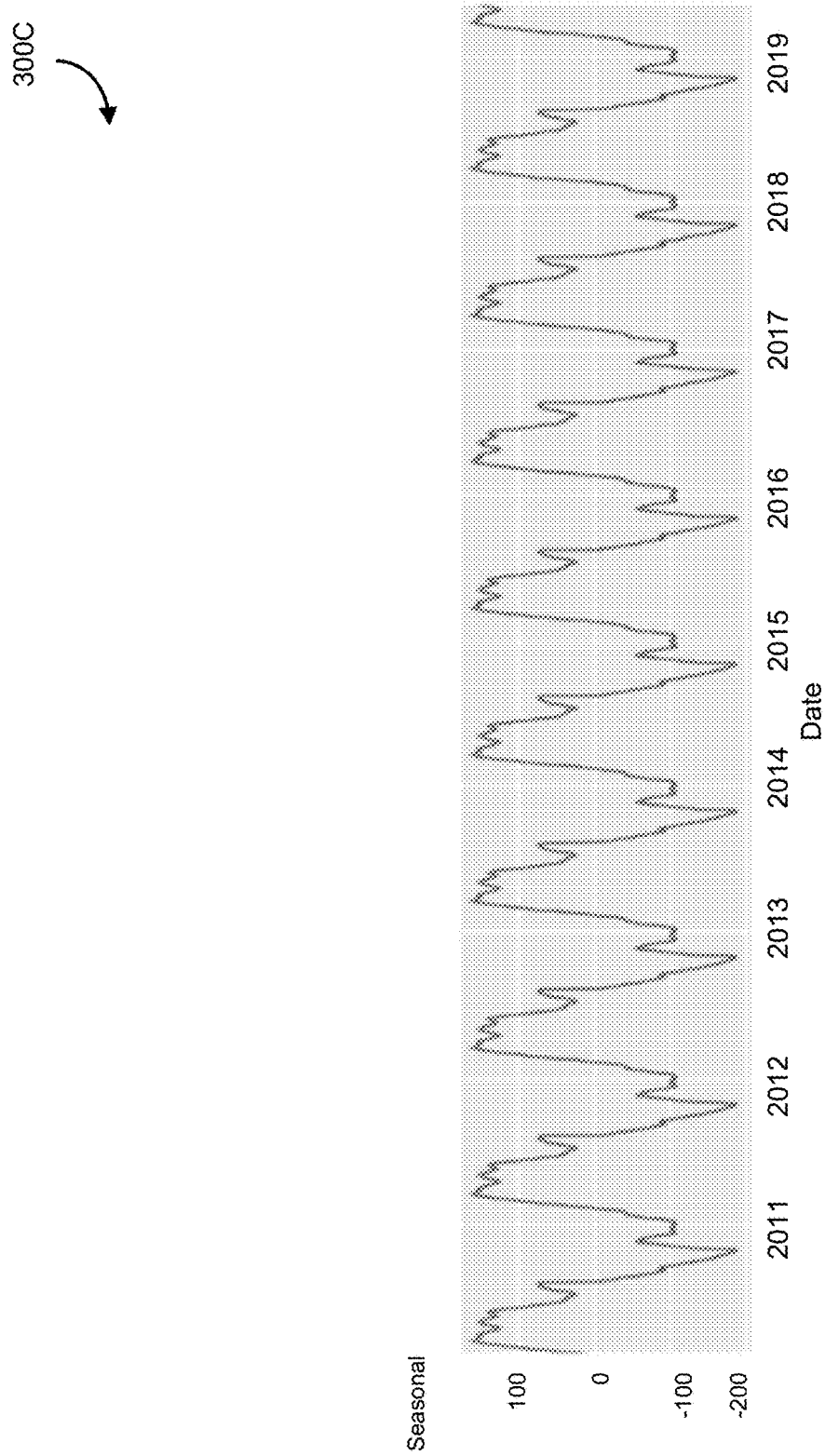
Figure 3D:
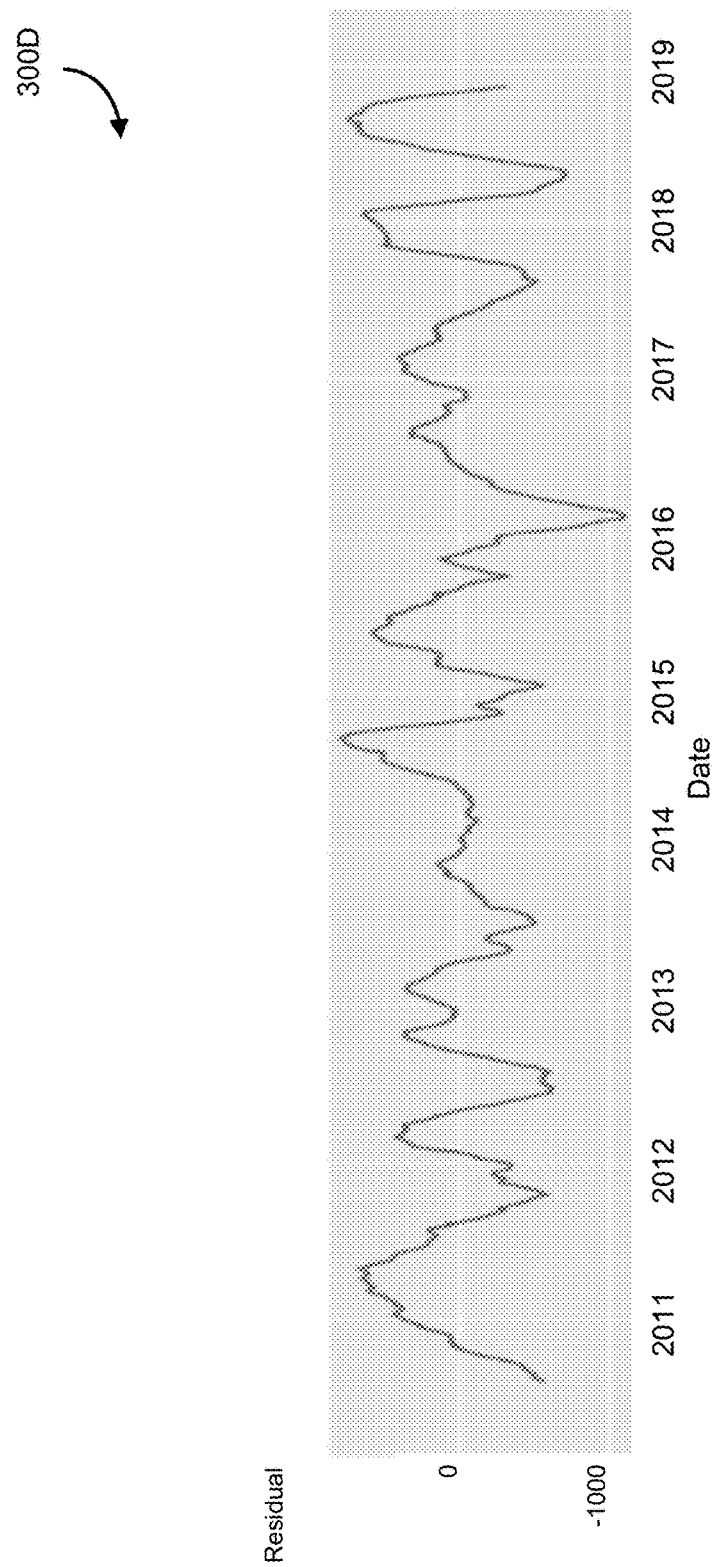

The preprocessing unit 118 may filter or pre-process the received numerical and news data according to one or more filter parameters. The filter parameters may be responsive to time series data (e.g., stock price data) possessing fundamental stochastic characteristics, such as Brownian motion, with continuous time and continuous state space. For example, the filter parameters may convert data subject to complete randomness to exhibit long term dependencies, so that said data is not subjected to Brownian motion and trying to predict future values may be more efficient. In example embodiments, the filter parameters are representative of a period of time which yields a reasonably smooth representation of the received numerical time-series data (e.g., data exhibiting long term dependencies). For example, in a nonlimiting example embodiment, a filter parameter can filter the received numerical time-series data into a subset of data including a moving average of the numerical time-series data (i.e., averaged numerical time-series data). Continuing the example, the filter parameter can be a 30 day moving average parameter, which filters stock prices of the received numerical time-series data into a 30 day moving average with a standard deviation of 1. Referring now to FIG. 2, graph 200 shows a 10 year Toronto Stock Exchange (TSX) Composite Index and a filtered 10 year TSX Composite Index 30 day Moving Average (MA) with a Standard Deviation (STD) of 1. In another non-limiting example embodiment, the filter parameter can be a 30 day moving average parameter, which filters stock prices of the received numerical time-series data into a 252 day moving average with a standard deviation of 1.

In example embodiments, filter parameters may be used to expose trends within the received numerical time-series data. The filter parameters may be parameters which encourage the received data sets to be represented as smooth curves associated with increasing functions. For example, the filter parameters may be used to generate trend and seasonality decompositions of the received financial conduction. In a non-limiting example embodiment, FIGS. 3A-3D show graphs (300A-300D) of an observed stock price average of an example company over a 10 year period (300A—part of which is repeated from diagram 200 in FIG. 2), a trend decomposition (FIG. 3B), a seasonal decomposition (FIG. 3C), and a residual decomposition of the trend decomposition (FIG. 3D) of the diagram 200 of FIG. 2. Diagram 300B shows a trend graph of the observed diagram 300A where a smoothing decomposition filter parameter has been applied. Diagram 300C shows a seasonal decomposition of the observed diagram 300A, wherein a seasonality filter parameter for accounting for seasonal impacts has been applied. Diagram 300D shows a decomposition of the observed diagram 300A where a residual filter parameter which captures entries removed from the seasonal decomposition has been applied.

Figure 4:
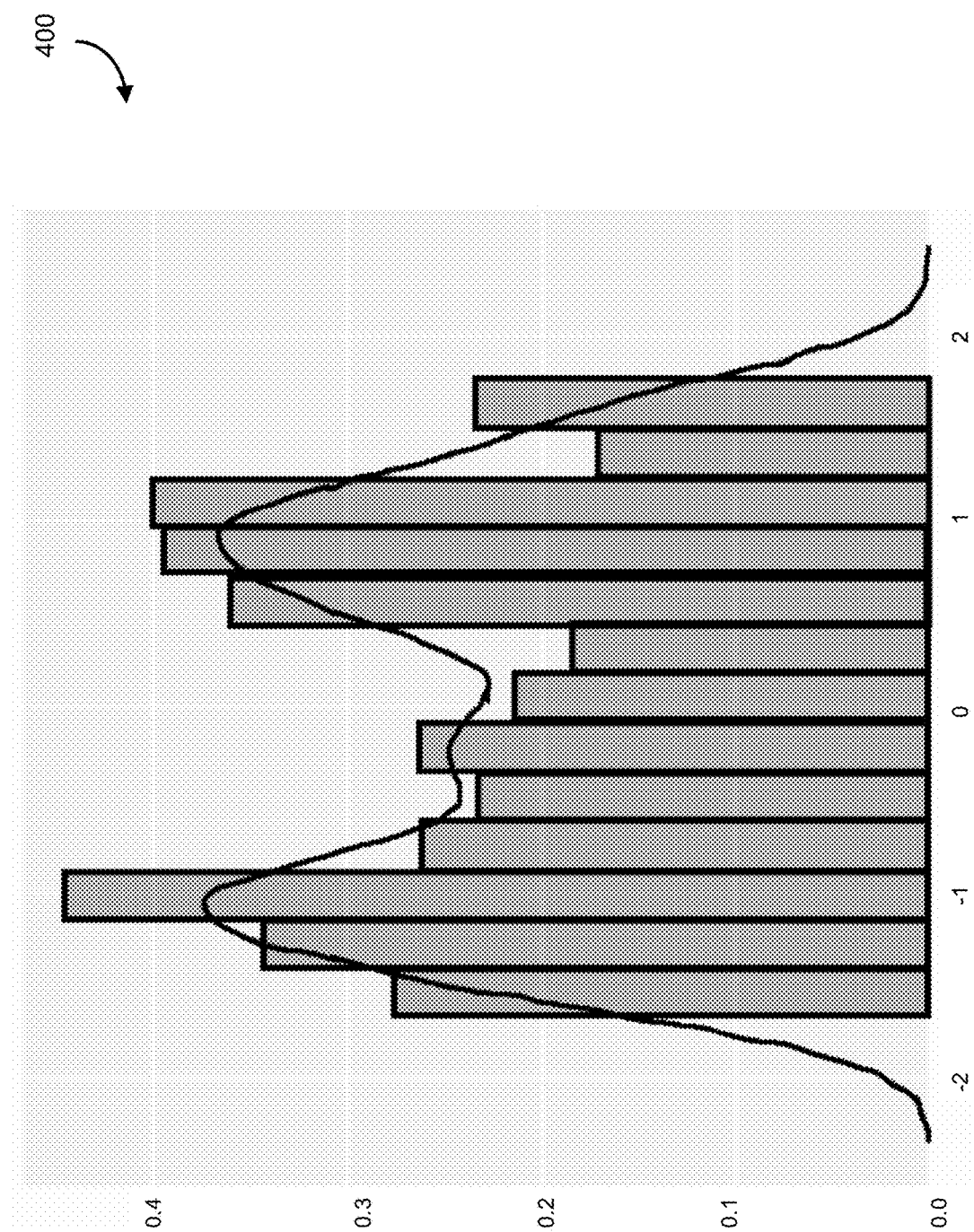
FIG. 4 is a graph showing the distribution of a Z-score transformed moving average of the graph in FIG. 2, according to some embodiments.

In example embodiments, the filter parameters may be used to ensure that the output data will have a target normal distribution and standard deviation. For example, a z-score transformation parameter may be used to ensure that the received data is transformed to have a mean of zero and a standard deviation of 1. Referring now to FIG. 4, diagram 400 shows a z-score transformation parameter applied to the 10 year TSX Composite Index values of FIG. 1.

Figure 5:
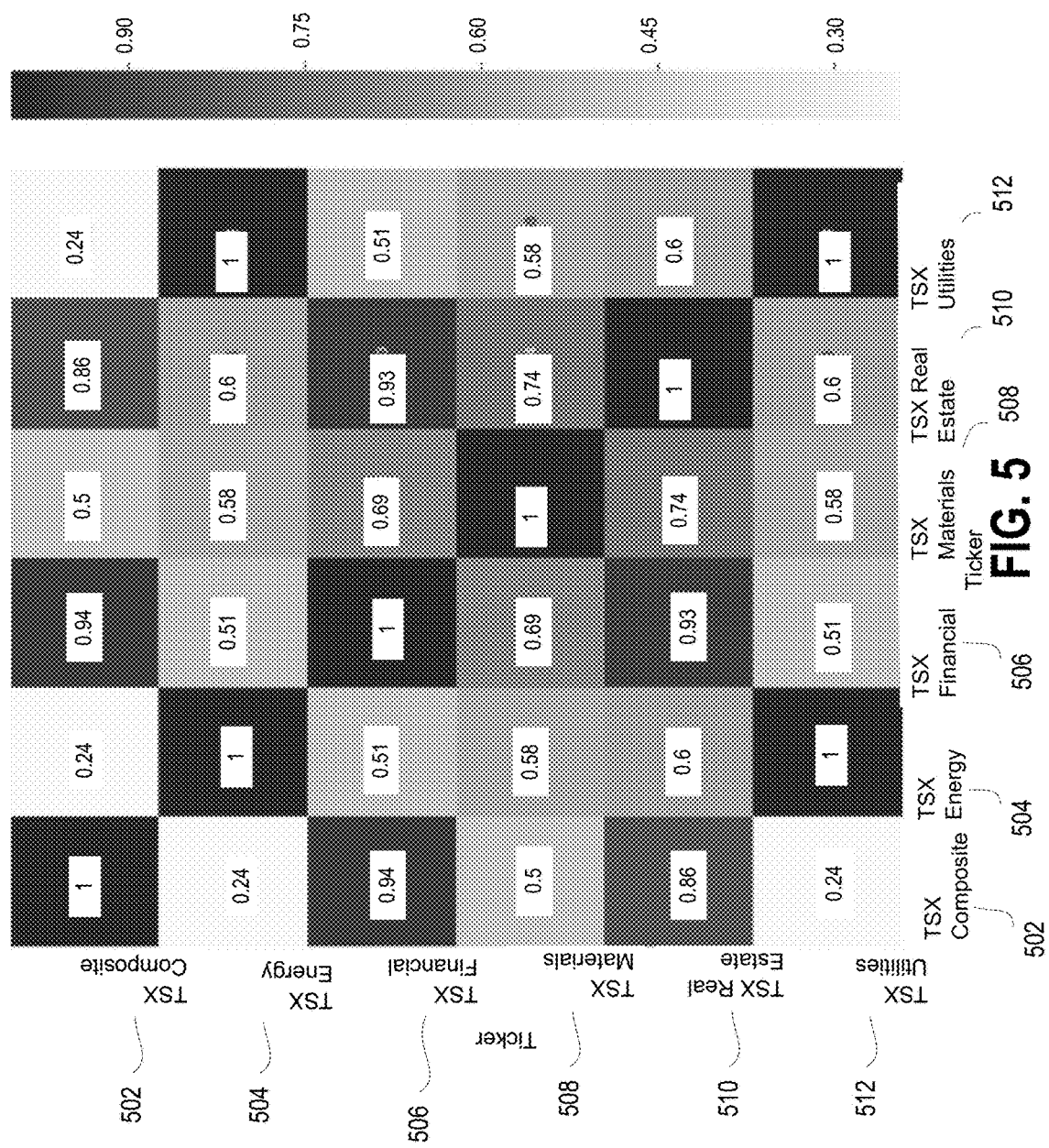
FIG. 5 is an example correlation matrix between example sector-based indices and the 10 year Toronto Stock Exchange Composite Index, according to some embodiments.

The filter parameters may be used to determine whether the received numerical time-series data will be responsive to a desired prediction. For example, the filter parameter may be a parameter which determines a correlation between the received numerical time-series data and the intended market of the desired prediction. Continuing the example, referring now to FIG. 5, diagram 500 shows a correlation matrix between major sector-based indices and the 10 year TSX Composite Index values, in terms of their price performance in the same period. Diagram 500 shows that there is a high correlation between the TSX Utilities Index 512 and the TSX Energy Index 504, and the filter parameter may filter numerical time-series data which are associated with the TSX Composite Index in order to determine funding opportunities in the energy industry.

Figure 6:
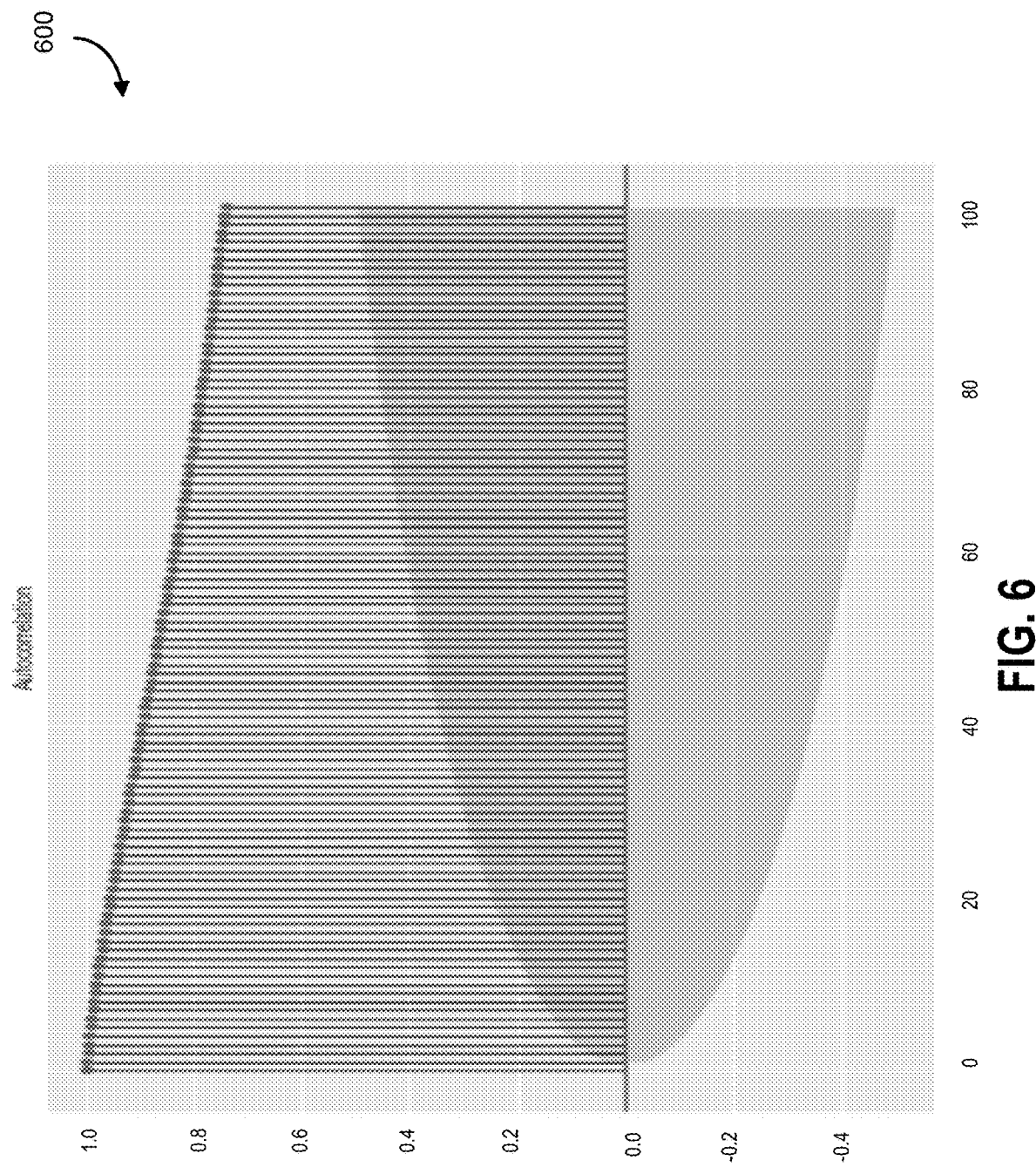
FIG. 6 is an example autocorrelation (ACF) graph of the 30 days (30D) moving average graph of FIG. 2, according to some embodiments.

Filter parameters may determine whether the received numerical time-series data exhibit a sufficient degree of interrelation based on an auto-correlation (ACF) plot. The auto-correlation (ACF) plot may be indicative of a decay process within the data. For example, where the decay process in the ACF is slow, indicating long term dependencies, traditional time series analysis techniques may not be optimal for making forecasts. The filter parameters may determine confidence intervals of interrelation. Referring now to FIG. 6 example graph 600 of Autocorrelation (ACF) of the 30 Days moving average is shown.

Referring again to FIG. 1, system 102 includes a neural network 104, a natural language processing engine 106 (alternatively referred to as a first machine learning model), and a second machine learning model 108 (alternatively referred to as a second machine learning model).

Neural network 104 is configured to receive the one or more numerical time-series data related to a set of historical financial transactions and process the received one or more numerical time-series data to generate one or more future feature data structures having a future feature value and a future instance value. In example embodiments, the future feature value is representative of a predicted moving average of the stock price of an entity, and the future instance value is a time associated with the predicted moving average.

First machine learning model 106 is configured to receive one or more unstructured textual news data related to an entity, and generate document descriptions of the documents within unstructured textual news data and to extract a sentiment from unstructured textual news data. In example embodiments, the document descriptions can be pre-defined, and include debt events, dividend events, analyst report events, economy/markets events, mergers and acquisitions events, quarterly results events, share repurchase events, non-relevant events, and so forth.

Second machine learning model 108 is trained with a dichotomy-marking function. The second learning machine learning engine is configured to receive the future feature data structures, the document descriptions, and the extracted sentiment, and determine whether the received future feature data structures, document descriptions, and extracted sentiments are within a boundary defined by the dichotomy-marking function.

The neural network 104, the first machine learning model 106, and the second machine learning model 106 may include a plurality of nodes which define a function used by the respective component to transform input data. For example, the second machine learning model 106 may include a plurality of nodes representative of a long short term memory architecture.

In example embodiments, the neural network 104, the first machine learning model 106, and the second machine learning model 106 are separate and discrete models. In some embodiments, for example, the neural network 104, the first machine learning model 106, and the second machine learning model 106 are integrated into a model architecture. The model architecture may be, for example, system 102.

Hereinafter, reference will be made to the accuracy of, or evaluating the results of, the neural network 104 and the first machine learning model 106, or some components thereof. The following metrics may be discussed as indicative of accuracy.

For time series forecasting (e.g., forecasting by the neural network 104), results are evaluated based on the Mean Squared Error (MSE) over train/test split validation, defined as:

$$\sqrt{\frac{1}{n}\sum_{i=1}^{n}(y_i - \hat{y}_i)^2}$$

Where $\hat{y}_i$ is the predicted moving average for each stock, and y is the actual moving average of the predicted stock.

For text processing and classification (e.g., first machine learning model 106), results are evaluated based on the accuracy and f1 score over five-fold cross validation. The accuracy and f1 score are defined as:

$$\text{accuracy}(y, \hat{y}) = \frac{1}{n}\sum_{i=1}^{n-1} 1(\hat{y}_i - y_i)$$

$$f_1 = 2 \cdot \frac{\text{precision} \cdot \text{recall}}{\text{precision} + \text{recall}}$$

Figure 7:
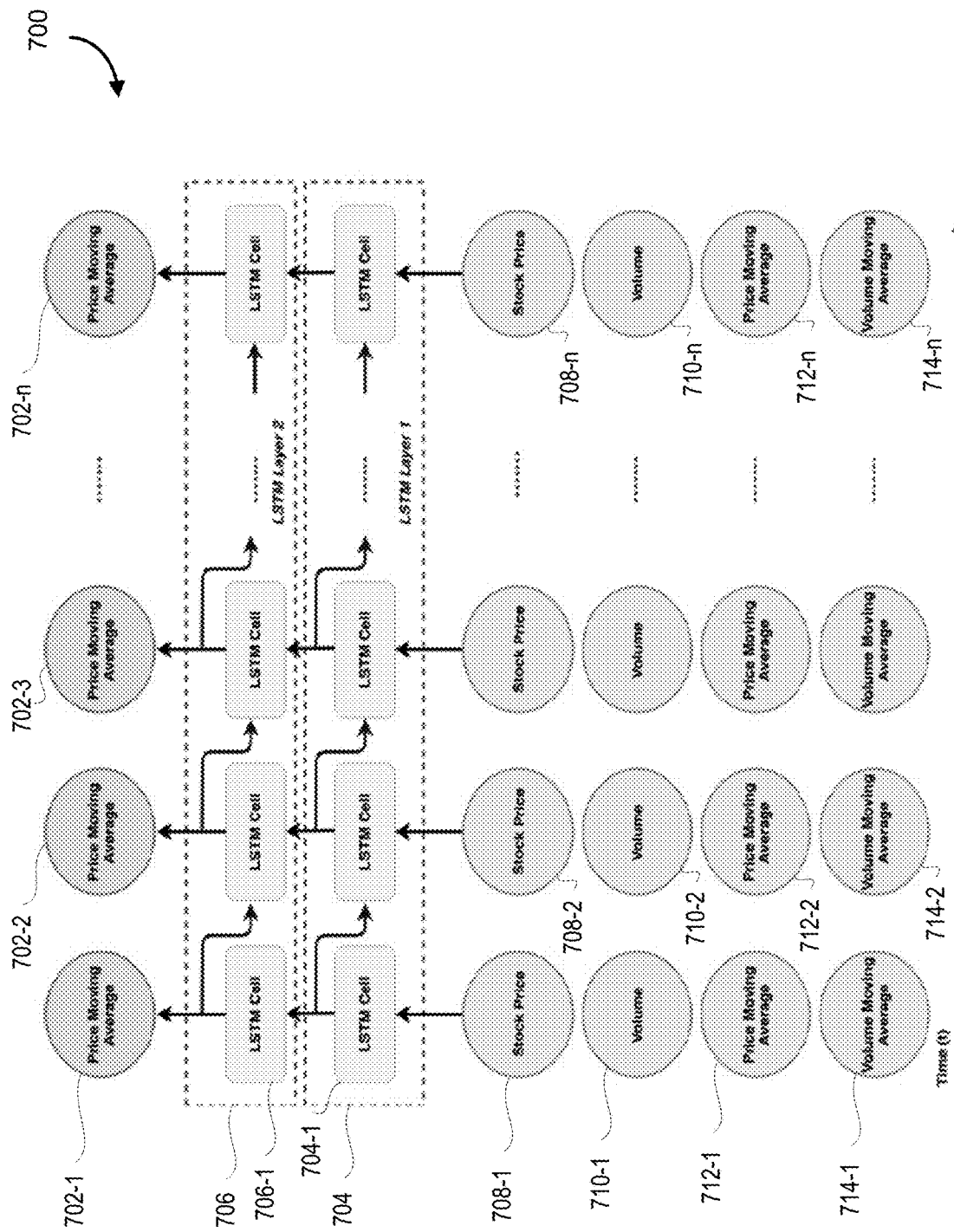
FIG. 7 is a block schematic that shows an example neural network, according to some embodiments.

Referring now to FIG. 7, a schematic diagram 700 of an example neural network is shown.

The neural network includes one or more Recurrent Neural Network (RNN) layers (e.g., a first LSTM layer 704 and a second LSTM layer 706, one Kth-order Hidden Markov Models), for analysing, forecasting and detecting anomalies in numerical time-series data. In example embodiments, the neural network is trained to generate a future feature data structure having a future feature value and a future instance value for numerical time-series data. For example, during training, the neural network may ingest numerical time-series data and attempt to determine a future feature value for each instance in the numerical time-series data. The ingested numerical time-series data includes a label for each instance in the numerical time-series data with the subsequent feature value. Continuing the example, the label for a first instance may include the stock price associated with the subsequent day of trading, allowing the neural network to evaluate the predicted or generated future feature data structure with the actual observed future feature data structure.

The RNN layers may each include one or more node sub-layers. For example, each RNN layer may include a plurality of neural network nodes. Each of the RNN layers may include one or more RNN elements (e.g., LSTM cell 704-1).

Figure 8:
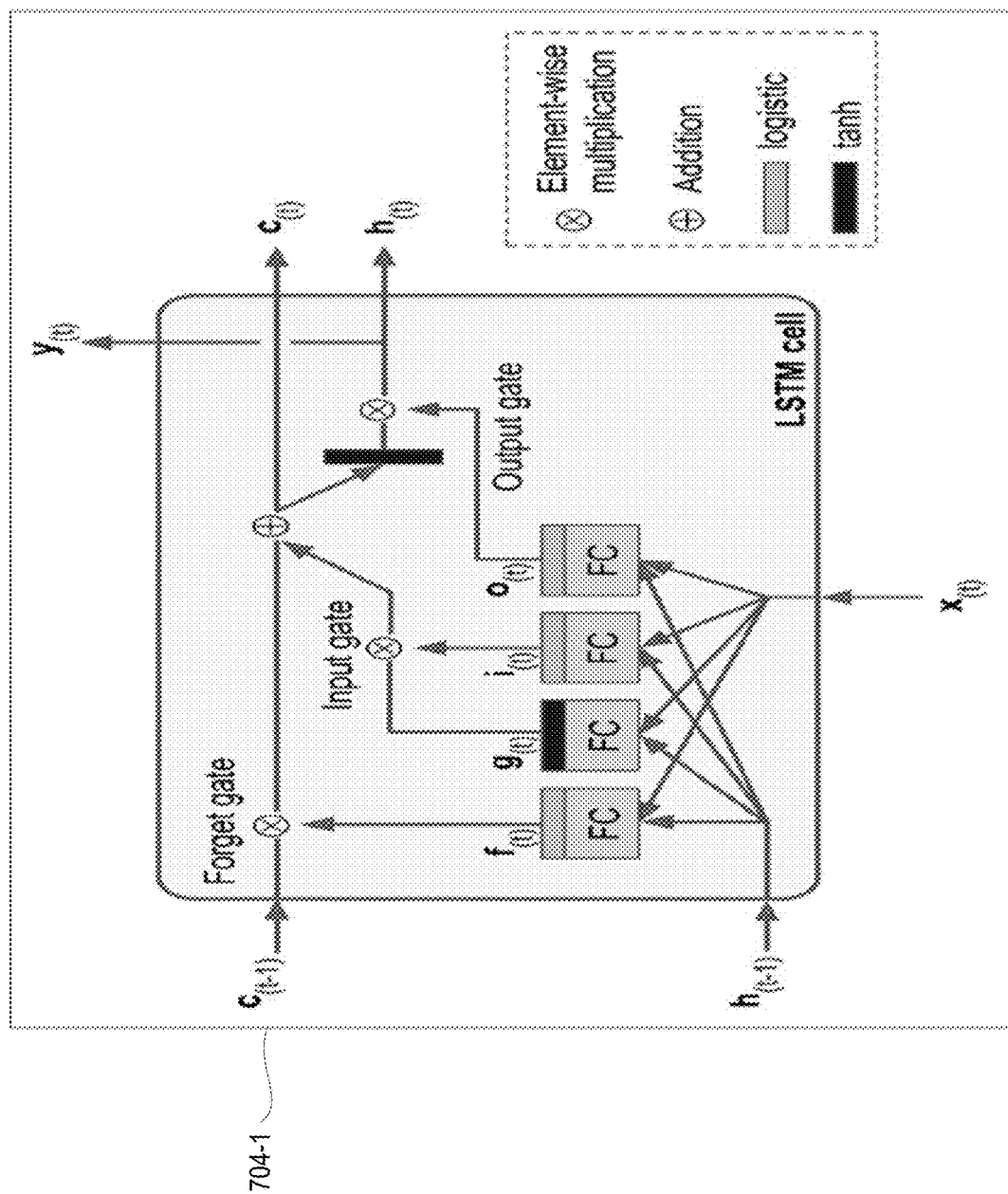
FIG. 8 is an illustration of an example LSTM RNN element, according to some embodiments.

FIG. 8 is a block schematic 800 that shows an example LSTM RNN element 704-1, according to some embodiments. The LSTM cell 704-1 includes a mechanism to learn when to forget values from a long-term state stored within the LSTM cell 704-1. For example, as the long term state (depicted by $c_{(t-1)}$) for a previous time series traverses from left to right across the LSTM cell 704-1 (i.e., an LSTM processes a new input), it passes through multiple gates. The first gate is the forget gate, where none, some, or all of the long term state $c_{(t-1)}$ can be replaced with the state representation associated with the input data (e.g., feature data structures from numerical time-series data and averaged numerical time-series data, or outputs of earlier RNN layers) or supplemented with the state representation associated with the input data via the additional operator. So, at each time step, some memories (e.g., state information) may be dropped from the long term state representation, and some memories may be added to the long term state representation. The resulting long term state representation $c_{(t)}$ is output as the long term state representation for the subsequent input state representation without further transformation.

In example embodiments where an addition operation occurs the long-term state is copied and passed through the activation function to make sure it is safely squashed in a certain range that the neural network can process. Then, the result is filtered by the output gate. This produces the short-term state $h_{(t)}$ which is equal to the cells output for this time step $y_{(t)}$.

An LSTM RNN element (such as LSTM RNN element 704-1) or other RNN element may be suited for forecasts where the auto correlation plot indicates that the time series possesses long term dependency due to their slow decay process, compared to some traditional methods such as ARIMA(p,q), SARIMA(p,d,q). For example, RNN elements are good at making predictions, "well, up to a point, of course", are designed specifically to effectively digest and analyze sequential data such as time series and linguistics data, and have an ability to anticipate that makes them capable of unexpected creativity. For example, LSTM RNN elements act as a memory cell that plays a significant role in determining when to forget what, so that it can efficiently store only relevant data to make robust predictions. This feature enables LSTM RNN elements to perform well with sequential data with long term memory properties.

Referring again to FIG. 7, where there is more than one RNN layer, the output of an RNN layer may be the input of a subsequent RNN layer. For example, in the shown embodiment, the first RNN layer is configured to receive the numerical time-series data and the averaged or filtered numerical time series data and transform one or more feature data structures within the numerical time-series data and one or more feature data structures of the averaged numerical time-series data into a latent feature representation the output of the first LSTM layer 704 is provided as an input to the second LSTM layer 706.

In the embodiment shown, the first LSTM layer 704 includes a long term state representation (c(t)), and a hidden state representation (h(t)). The long term state representation may capture learned interrelations between distant elements in time series data. The hidden state representation may capture learned interrelations between elements within time series data.

The first LSTM layer 704 transforms one or more feature data structures within the numerical time-series data (e.g., the stock price 708, and the volume 710 inputs) and one or more feature data structures of the averaged numerical time-series data (e.g., the price moving average 712, and volume moving average 714 inputs) into a first state representation (x(t)). In example embodiments, the first state representation is simply a vector representation of the feature data structures, where for example the stock price 708 occupies a first dimension of the vector representation, the volume 710 occupies a second dimension of the vector representation, and so forth.

The first LSTM layer determines whether the long term state representation (or a portion thereof) should be forgotten. In example embodiments, the first LSTM layer includes a forget gate for making said determination, the forget gate including a plurality of nodes, a bias, and a logistic function, such that the first state representation and the hidden state representation are multiplied by weight matrices and a bias defined by the plurality of nodes, and the logistic function is applied to the resulting value. In this way, in response to the logistic function outputting a forget value (e.g., a '0'), the forget gate "forgets", or does not update the long term state representation, with the first state representation. Conversely, in response to the logistic function outputting a remember value (e.g., a '1'), the forget gate updates the long term representation with the whole first state representation by multiplying the logistic function output to the existing long term state representation.

The first LSTM layer 704 also determines whether at least some of the first state representation and the hidden state representation should be added to the long term state representation. In example embodiments, similar to the forget gate above, the first LSTM layer 704 includes an update gate for said determination including a plurality of nodes. The update gate further includes a logistic function and a tan h function. The update gate, similar to the forget gate, multiplies the first state representation and the hidden state representation with weight matrices and bias(es) defined by the plurality of nodes of the update gate, and the update gate logistic function is applied to the resulting value. The update gate further generates an intermediate vector representation of the first state representation and the hidden state representation by processing same with the tan h function. Subsequently, the logistic function output and the tan h function output combined (e.g., via multiplication) and used to update the previously updated long term state representation (i.e., the long term state representation updated with the output of the forget gate).

The first LSTM layer 704 determines a latent representation based on the updated updated long term state representation (i.e., the long term state representation after being updated by the forget gate and the update gate) and at least some of the first state representation and the hidden state representation. In example embodiments, similar to the forget gate above, the first LSTM layer 704 includes an output gate for said determination including a plurality of nodes. The output gate creates a second intermediate vector representation of the updated updated long term state representation with a tan h function. The output gate further determines a filter by passing the first state representation and the hidden state representation with a logistic function, and generates the latent representation by multiplying the second intermediate vector representation and the filter.

The first LSTM layer 704 outputs the latent state representation to the second LSTM layer 706.

The second LSTM layer 706 includes similar structural elements as described in respect of the first LSTM layer 704. In example embodiments, the received latent representation has not been dimensionally reduced by the first LSTM layer 704, or the received latent representation may be a dimensionally reduced input compared to the input to the first LSTM layer 704 (e.g., the first LSTM layer 704 latent representation is a predicted future feature data structure).

Transforming the latent representation into the second state representation, similar to the first LSTM layer 704, may be a vector representation of the latent representation. For example, where the latent representation includes 4 variables, the second state representation may be a structured 4 dimensional vector, with each variable occupying the same dimensional space for each second state representation.

The second LSTM layer 706 processes the second state representation with a forget gate, an update gate, and an output gate analogous to the similarly named elements in the first LSTM layer 704, to generate the future feature data structure.

Each of the forget gate, the update gate, and the output gate of each of the first LSTM layer 704 and the second LSTM layer 706 may be tuned with the following hyper parameters: 65 nodes (alternatively referred to as neurons), a learning rate of 0.01, a Lambda l2 regularization parameter of 0.003 and a gradient clipping parameter of 2.5

In example embodiments, the first LSTM layer 704 takes as inputs sequences of the following 4 features: a stock price, a volume of trading associated with the stock price, a price moving average and a volume moving average. The first LSTM layer 704 learns complex interrelationships between input sequences, which can also be levels of abstractions of the input features not readily or easily interpretable by humans to generate latent representations. The first LSTM layer 704 outputs, based on the learned complex and abstract representations, a latent representation, e.g., an intermediate future price moving average, and passes these future feature values into the second LSTM layer 706.

The first LSTM layer 704 can be configured to operate based on the following equations:

$$i_{(t)}^{(1)} = \sigma(W_{xi}^T \cdot x_{(t)} + W_{hi}^T \cdot h_{(t-1)} + b_i) \quad (1)$$

$$f_{(t)}^{(1)} = \sigma(W_{xf}^T \cdot x_{(t)} + W_{hf}^T \cdot h_{(t-1)} + b_f) \quad (2)$$

$$o_{(t)}^{(1)} = \sigma(W_{xo}^T \cdot x_{(t)} + W_{ho}^T \cdot h_{(t-1)} + b_o) \quad (3)$$

$$g_{(t)}^{(1)} = \tan h(W_{xg}^T \cdot x_{(t)} + W_{hg}^T \cdot h_{(t-1)} + b_g) \quad (4)$$

$$c_{(t)}^{(1)} = f_{(t)}^{(1)} \otimes c_{(t-1)}^{(1)} + i_{(t)}^{(1)} \otimes g_{(t)}^{(1)} \quad (5)$$

$$\hat{y}_{(t)}^{(1)} = h_{(t)}^{(1)} = o_{(t)}^{(1)} \otimes \tan h(c_{(t)}^{(1)}) \quad (6)$$

Where $x_{(t)}$ is the input vector at time t, b is the bias term, W is the weight matrices, $i_{(t)}^{(1)}$ is the input gate computation, $f_{(t)}^{(1)}$ is the forget gate computation, $o_{(t)}^{(1)}$ is the output gate computation, $g_{(t)}^{(1)}$ is the main layer output computation, which is responsible for the first LSTM layer 704 learning new information, $c_{(t)}^{(1)}$ is the long term memory computation, and $\hat{y}_{(t)}^{(1)}$. $h_{(t)}^{(1)}$ are the latent representation (alternatively referred to as an intermediate future feature value) computation The second LSTM layer 706 learns even more complex and abstracting representations of input sequences by learning complex and abstracting representations associated with the latent representation.

The second LSTM layer 706 consumes the hidden features that approximates the short term relationship of the raw input from the first LSTM layer 704 $h_{(1)}, \ldots, h_{(t)}$ then applies the exact same computation as above. (e.g., the second LSTM layer 706 takes in a 1 by 10 vector output from the first LSTM layer 704). The second LSTM layer 706's final output is the future feature value for input latent representation sequence by making use of both insights extracted from first LSTM layer 704 and the second LSTM layer 706. The second LSTM layer 706 uses the same equations (1)-(5) set out above, with a future feature value computation in place of the latent representation computation defined by:

$$\hat{y}_{(t)}^{(2)} = h_{(t)}^{(2)} = \phi_{(2)}(h_i^{(1)}, h_{(t-1)}^{(2)}) \quad (7)$$

The RNN layers, for each time instance in a numerical time-series data, receive input data, and output a latent representation or a future feature value. The RNN layers may process a plurality of features at a plurality of instances, as shown in the diagram via the input data delimited the "–n".

In example embodiments, the neural network 104 is tuned to generate the future feature value for a desired instance value (e.g., a 30 day average, or a 252 day average). Where the neural network 104 is tuned to generate the future feature value for a desired instance value, the pre-processor 118 may filter the numerical time-series data for the specified time range, and the neural network 104 may generate the future feature value for the desired instance value based on the filtered numerical time-series data. Generating future feature values for various desired instance values is contemplated.

In example embodiments, one or more RNN layers may be configured to receive one or more inputs (i.e., a multivariate input) and output a future feature data structure having one or more values (i.e., multivariate predictions). Various combinations of RNN layers configured to either receive multi-variate inputs, or output multi-variate outputs is contemplated.

For example, in the shown embodiment, the first RNN layer 704 is configured to receive four variables/features (e.g., stock price 708, volume 710, price moving average 712, and volume moving average 714) and output the latent representation to the second RNN layer 706, which in turn converts the latent representation into the future feature value of a price moving average output 702 (e.g., a forecast for the next 30 days or 252 days of the moving average). In example embodiments, the first RNN layer 704 may receive four variables/features (e.g., stock price 708, volume 710, price moving average 712, and volume moving average 714) and output a latent representation of each of the four input variables to the second RNN layer 706, which in turn converts the latent representation of each of the four input variables into a future feature data structure having a future feature value of a price moving average output 702 (e.g., a forecast for the next 30 days or 252 days of the moving average).

The one or more RNN layers may also generate a tolerance interval associated with the numerical time-series data. For example, the tolerance interval may be determined by reference to a standard deviation of a feature value within the numerical time-series data or the averaged numerical time-series data. For example, the tolerance interval may be a a moving average 702 tolerance interval within one, two, three standard deviations extracted from historical numerical time-series data, and so forth.

The neural network 104 may be configured to generate and send an alert to a user device 114 (e.g., a banker user device) upon detecting or generating the future feature value fluctuating outside of the tolerance interval. For example, the alert may be a text message.

In example embodiments, the tolerance interval is a fixed value, user defined, or based on a yearly minimum or maximum, and so forth.

According to an example embodiment, the neural network 104 was trained and validated on major companies (e.g., 103 major companies) listed on the Toronto Stock Exchange and achieved reasonable approximation of the future feature value, as shown in Table 1 below:

| Sector | Period | Average Test MSE |
| --- | --- | --- |
| Financial | 30D | 0.0079 |
| Financial | 252D | 0.1301 |
| Energy | 30D | 0.0093 |
| Energy | 252D | 0.1501 |
| Technology | 30D | 0.0328 |
| Technology | 252D | 0.1768 |

In a variant approach, a unique set of hyper parameters for each of the RNN layers can be tailored specifically to each company's stock in each period of forecasting. For example, the neural network 104 may alter the hyper parameters associated with the LSTM for numerical time series data associated with different entities. This may make the forecasting engine more powerful and reliable.

Figure 9A:
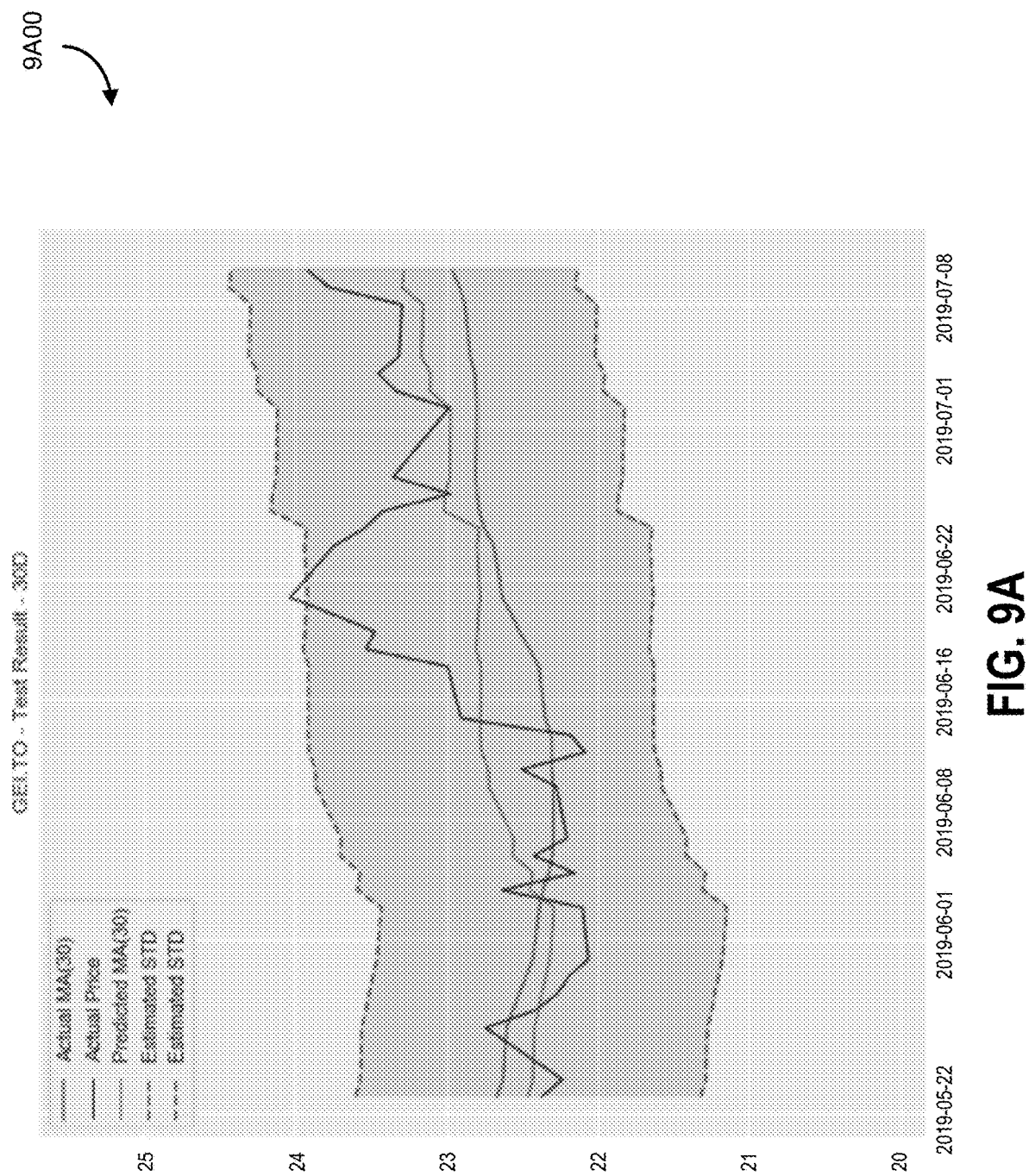
FIG. 9A is a 30D moving average diagram generated by processing an example numerical time-series data with the neural network of FIG. 8, according to some embodiments.

According to some embodiments, for example, the neural network 104, including the first RNN layer 704 and the second RNN layer 706 is tuned with the following set of hyper parameters which may give the lowest average Mean Squared Error (MSE) across multiple sectors:
Number of stacked layers: 2 layers of LSTM cells
Number of neurons each layer: 65
learning rate: 0.01
Lambda l2 regularization: 0.003 (to avoid overfitting)
Gradient clipping: 2.5 (to prevent gradient exploding during training)
Input sequence length: 10
Output sequence length: 2
Input dimension: 4
Output dimension: 1
Activation function: Relu
Optimization function: Adam FIG. 9A is a diagram 900A generated where an example numerical time-series data for Gibson Energy, as listed on the TSX, was processed by the neural network 104 to predict a 30 day moving average of the stock price.

Figure 9B:
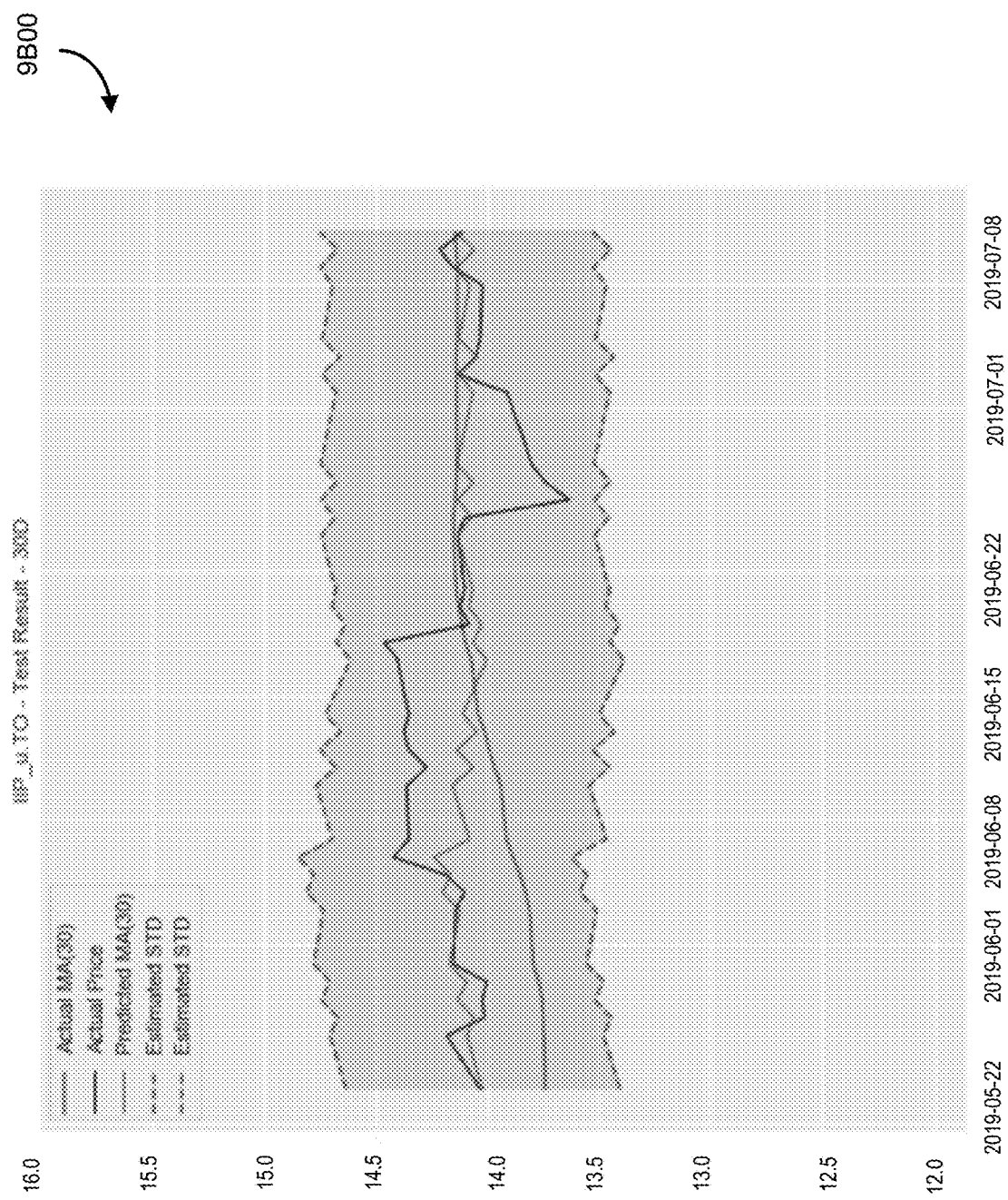
FIG. 9B is another 30D moving average diagram generated by processing another example numerical time-series data with the neural network of FIG. 8, according to some embodiments.

FIG. 9B is a diagram 900B generated where an example numerical time-series data for Interrent Real Estate Investment Trust, as listed on the TSX, was processed by the neural network 104 to predict a 30 day moving average of the stock price.

Figure 10A:
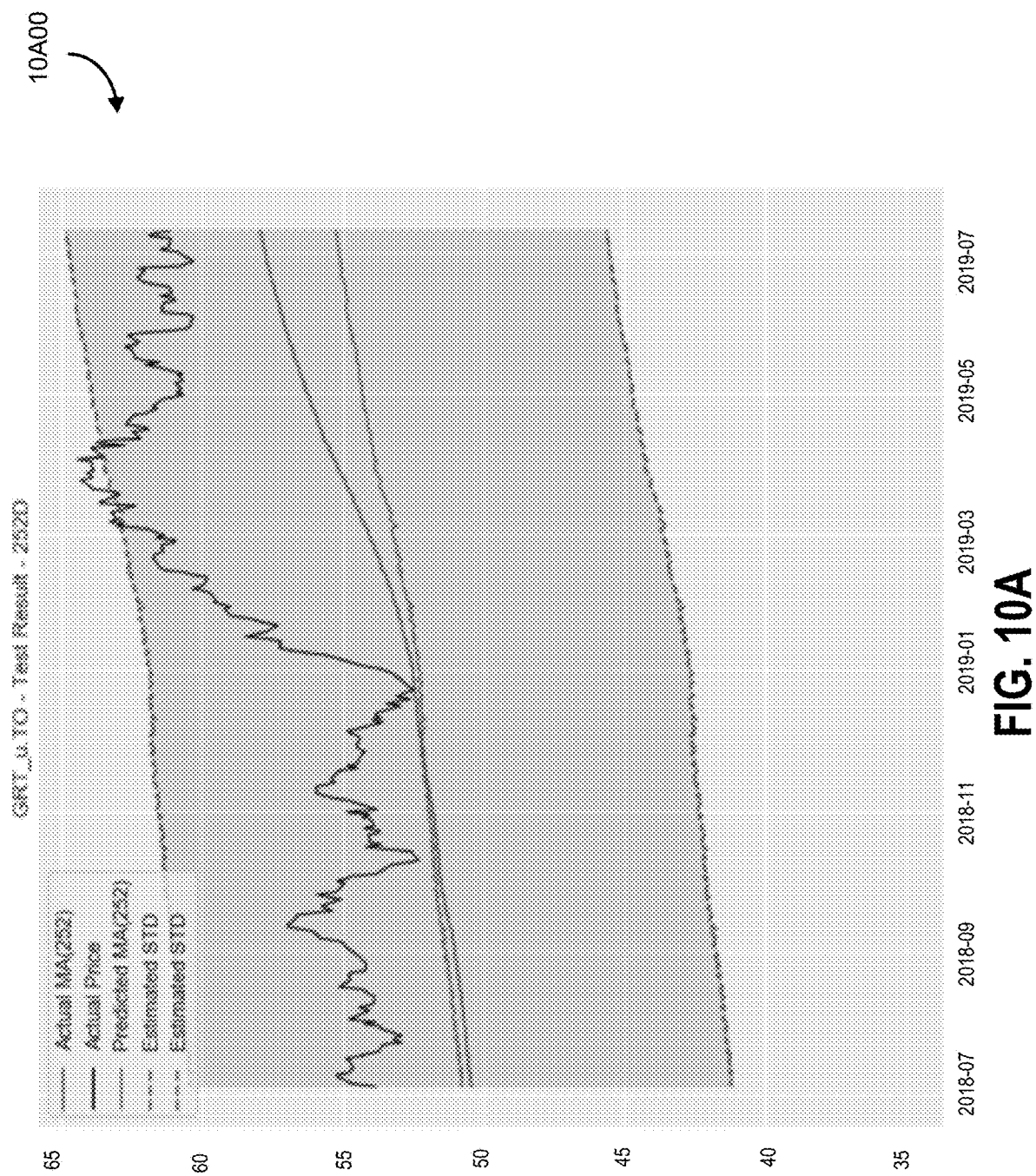
FIG. 10A is a 252D moving average diagram generated by processing an example numerical time-series data with the neural network of FIG. 8, according to some embodiments.

FIG. 10A is a diagram 1000A generated where an example numerical time-series data for Granite Real Estate Investment Trust, as listed on the TSX, was processed by the neural network 104 to predict a 252 day moving average of the stock price.

Figure 10B:
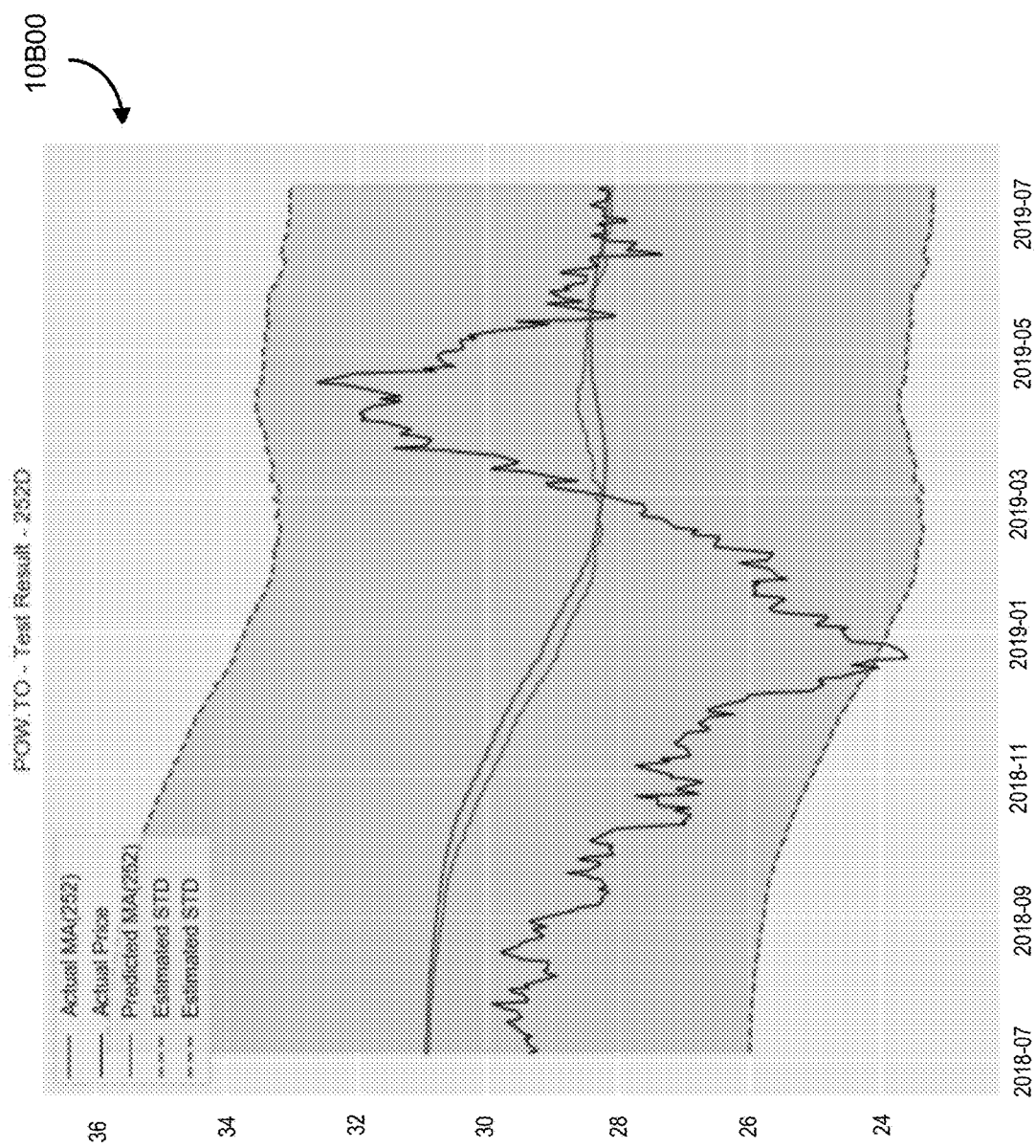
FIG. 10B is another 252D moving average diagram generated by processing another example numerical time-series data with the neural network of FIG. 8, according to some embodiments.

FIG. 10B is a diagram 1000B generated where an example numerical time-series data for Power Corporation of Canada, as listed on the TSX, was processed by the neural network 104 to predict a 252 day moving average of the stock price.

Figure 11:
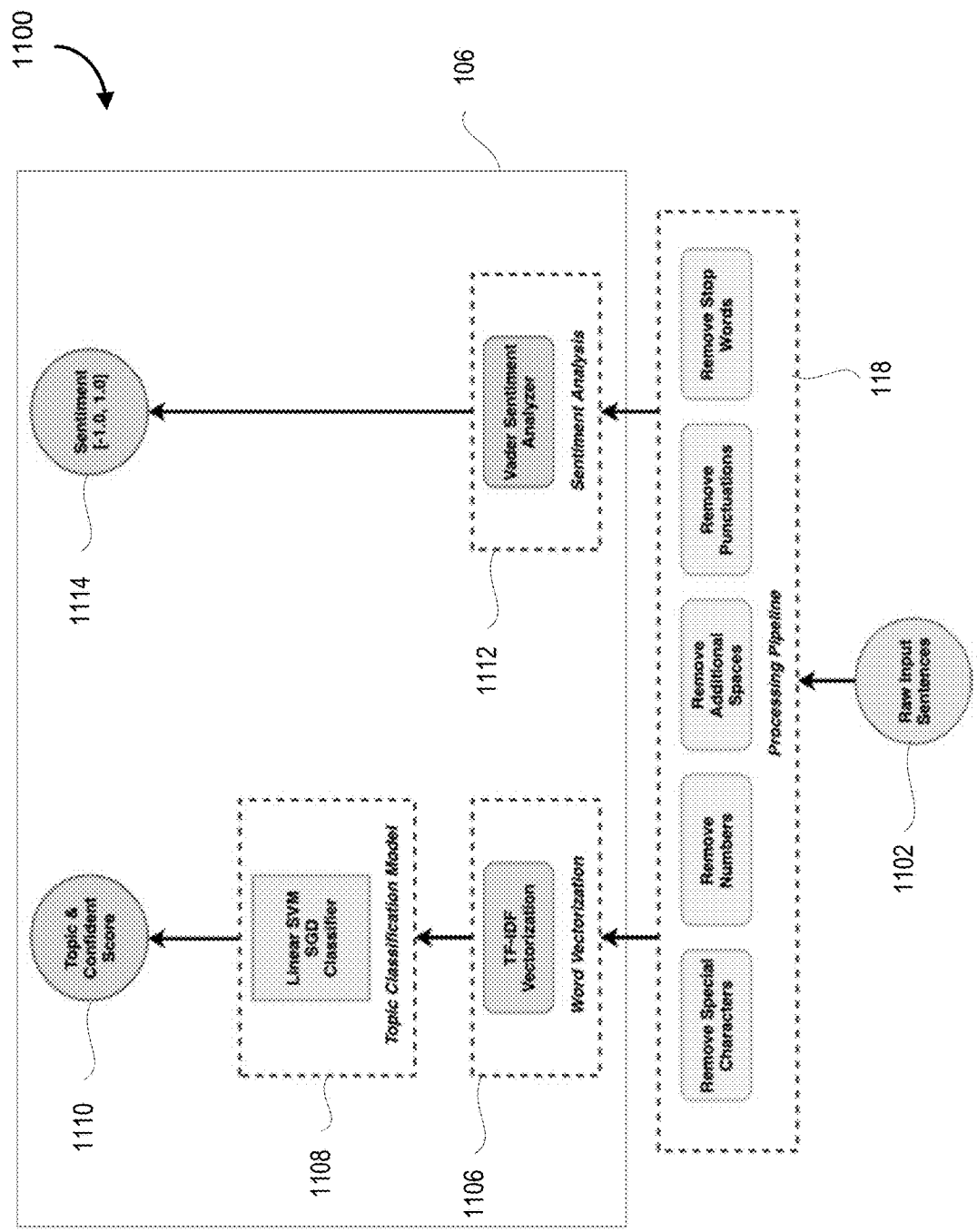
FIG. 11 is an example schematic diagram of a natural language processing engine and a preprocessing unit, according to some embodiments.

FIG. 11 shows an example schematic diagram 1100 of the first machine learning model 106 and the preprocessing unit 118, according to example embodiments.

In the shown embodiment, the preprocessing unit 118 receives the unstructured textual news data set 1102 before the data is processed by the first machine learning model 106, and provides preprocessed unstructured textual news data to the first machine learning model 106.

The preprocessing unit 118 may process the received unstructured textual news data set 1102 in a variety of manners. For example, the preprocessing unit 118 can process the received unstructured textual news data set 1102 to remove stop words (e.g., commonly recurring work at no meaning resentenced), remove punctuation, remove additional spacing, remove numbers, and remove special characters. Pre-processing the received unstructured textual news data set 1102 may make the first machine learning model 106 operate more efficiently.

The first machine learning model 106 may include a sentiment analyzer 1112 used to extract sentiment from unstructured text data, generating a resulting sentiment score 1114, and a document description classifier, including a word vectorizer 1106, a classifier 1108, used to generate document descriptions from unstructured textual news data, resulting in a document description 1110. For example, among other text to features methods such as Hot Encoding, Count Vectorization, N-gram based featurizing, co-occurrence matrix, the system 102 may utilize a TF-IDF word vectorizer 1106 or a Word Embedding (Word2Vec) with Gensim word vectorizer 1106 to generate a document description (e.g., debt offering). The generated document description may be determined where the classifier 1108 determines the likelihood of the ingested word vectors as being associated with existing document descriptions (e.g., 50% chance document description is debt, 25% chance that it is a quarterly result) and determine the document description based on the most likely document description as defined by said likelihoods.

During operation, the word vectorizer 1106 may be configured to represent each of the one or more words in each document within the unstructured textual news data set 1102 with one or more word vectors. In example embodiments, the word vectorizer 1106 generates the one or more word vectors by structuring the vectorized representation with a term frequency and inverse document frequency (TF-IDF) of text words within each document. For example, word vectorizer 1106 may use the term frequency-inverse document frequency (TF-IDF) algorithm to represent how important a respective word is to a document in a set of documents, normalizing words that appear frequently in all the documents. The term frequency (TF) of the TF-IDF algorithm can be the ratio of the count of a word present in a sentence to the length of said sentence.

TF may capture the importance of the word irrespective of the length of the document. Continuing the example, a word with the frequency of 3 in a sentence with a length of 10 words does not imply the same relevance of a word with the frequency of 3 in a sentence with a length of 100 words. The TF portion allows the word vectorizer 1106 to assign a greater importance to the word in the first scenario. The inverse document frequency (IDF) portion of the TF-IDF algorithm includes representing each word as the log of the ratio of the total number of rows to the number of rows in a particular document in which that word is present; IDF=log (N/n), where N is the total number of rows and n is the number of rows in which the word was present. IDF can be used to represent the rareness of a word. For example, words like "a", and "the" show up in most documents, but rare words will not be in all documents in a set of documents. Therefore, if a word appears in almost all documents, then that word is likely of limited use in classifying the document, or in information retrieval. IDF addresses this problem. TF-IDF is the product of TF and IDF so that both of the drawbacks are addressed, which may improve predictions and information retrieval of relevant information. The resulting vector may be structured such that the terms are similarly sorted based on their relative determined importance.

The word vectorizer 1106 may be configured to vectorize unigrams (i.e., single words), or the word vectorizer 1106 can be configured to vectorize one or more words (e.g., bigrams, etc.). For example, the vectorizer 1106 may generate a vector representative of a frequency of two words (e.g., raising capital, as opposed to raising and capital individually) in the respective document. Various word chains may be vectorized by the word vectorizer 1106.

Once the word vectorizer 1106 has vectorized all words in a respective document, the word vectorizer 1106 may be configured to populate a document representation with the constituted word vectors and the respective TF-IDF scores. For example, a document representation may include the vectorized representation associated with each word within the document, as opposed to the text as found in the document.

Figure 12:
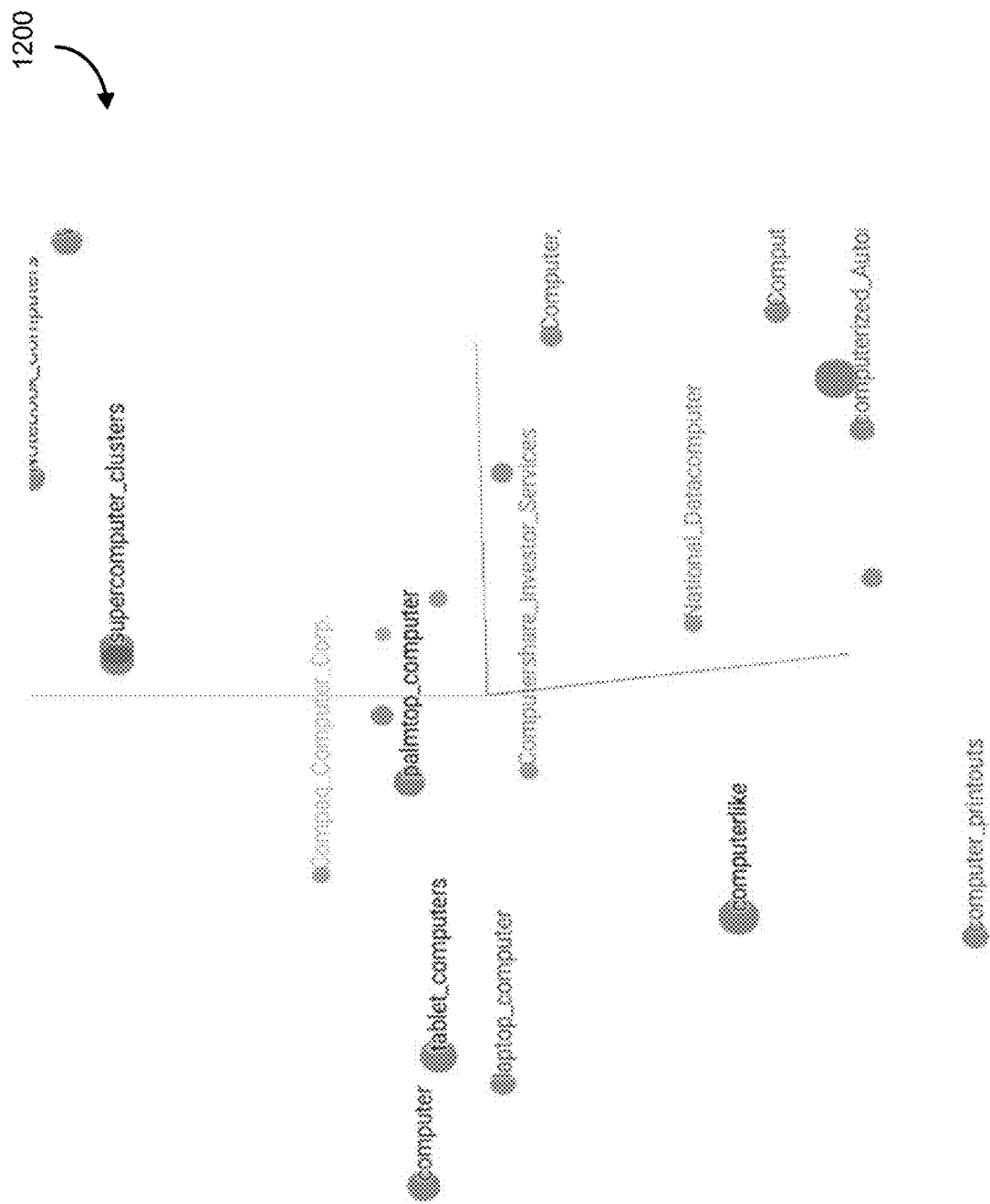
FIG. 12 is a visual representation of an example word semantic interrelationship vector space, according to some embodiments.

In example embodiments, the word vectorizer 1106 is pre-trained (or trained) with a mapping function interrelating text words and word vectors to generate the one or more word vectors. For example, the word vectorizer 1106 may use a pre-existing word semantic interrelationship vector space, such as the Word Embedding (Word2Vec) algorithm, to generate word vectors. For the sake of simplicity, in an example, the system uses three dimensions to represent the following words: apple: [1.13, 2.23, 7.77], orange: [1.01, 2.04, 7.22], car [8.41, 2.34, −1.28]. A visual representation of an example word semantic interrelationship vector space 1200 is shown in FIG. 12.

Mapping each of the one or more words onto a word semantic interrelationship vector space may allow the word vectorizer 1106 to reduce the dimensionality of the received data by representing each word using fixed dimension vectors. For example, the predefined vector space (e.g., 3 in the case of some embodiments), may fix a number of dimensions (or features) regardless of how large the text corpus is. In some embodiments, the vector space is a function of the size of the unstructured textual news data set 1102. In example embodiments, the predefined vector space, in contrast to Bag-of-Word techniques, does not increase the number of dimensions as the number of vocabularies increases.

Generating word vectors with a pre-existing word semantic interrelationship vector space, such as Doc2Vec, may be a robust and scalable approach, and may encode semantic relationships among words. For example, words having similar meanings are closer to each other in the pre-existing word semantic interrelationship vector space (unlike Bag-of-Word (BoVV) which represents words as binary values (e.g., 0 or 1), and is unable to capture the similarity between words). Referring again to the example vectors apple: [1.13, 2.23, 7.77], orange: [1.01, 2.04, 7.22], car [8.41, 2.34, −1.28], the vectors capture semantic relationships, as the Apples vector and the Oranges vector are closer to one another as compared to the relatively far away Cars vector in the vector space.

In example embodiments, the word vectorizer 1106 is a DBOW word vectorizer 1106, analogous to the Skip-gram model in Word2Vec, pre-trained with a learned probability distribution of predicting paragraph representations from randomly-sampled words within paragraphs. For example, the word vectorizer 1106 may process the entire news data set after everything that is single text header/body in the news data set has been processed by the pre-processor 118. In such embodiments, the DBOW word vectorizer 1106 vectorizes each paragraph into vectors with a learned probability distribution (e.g., learned based on a neural network within the first machine learning model) of predicting paragraph representations from randomly-sampled words within paragraphs.

In example embodiments, the word vectorizer 1106 uses a term selector operating a $\chi^2$ (chi square) test to vectorize the words to determine the most relevant terms in a collection of documents, a document, a paragraph, or other word grouping. The term selector with $\chi^2$ (chi square) test can produce meaningful insights about received news data and can be useful to improve classification performance and computational efficiency.

The term selector with $\chi^2$ (chi square) test is computed, in example embodiments, by converting the terms of the document and structuring them into features of a vectorial representation of the grouping including $\chi^{21}$ where $\chi^2$ is computed as follows:

$$\chi^2(f, t) = \frac{N(AD - CB)^2}{(A + C)(B + D)(A + B)(C + D)}$$

Where f is a feature (a term in this case), t is a target document description variable being predicted, A is the number of times that f and t co-occur, B is the number of times that f occurs without t, C is the number of times that t occurs without f, D is the number of times neither t or f occur and N is the number of observations.

FIG. 13 is a set of drawings 1300 indicating the most correlated words to each document description based on chi-squared test for an example news data set. The terms with a high $\chi^2$ can be considered relevant for the news data categories being analyzed. For example, the terms acquisition, acquire and buy can be considered relevant for mergers and acquisitions.

Referring again to FIG. 11, the resulting word vectors, or document vectors, or other vector output of the word vectorizer 1106 is processed by the classifier 1108 to generate a document description which the classifier 1108 has been trained to identify. For example the document descriptions the classifier has been trained to identify may include, news with strong economic driven signals such as quarterly results, analyst ratings, merger acquisition, share buyback or dividend payout, debt, etc. (e.g., categories that bank clients care about the most as a result of said news big impact).

The classifier 1108 learns, based on training data, a mapping function interrelating vector representations and document descriptions by generating document descriptions for training documents and assessing the performance of the generated document descriptions against the labelled document descriptions associated with the training documents. The classifier adjusts the mapping function in relation to determining the generated document descriptions are not sufficiently related (e.g., coincide with) the labelled document descriptions, learning the more accurate mapping function. Subsequently, during operation, the classifier 1108 receives the vectorized representations of the word vectorizer 1106, and generates a document description of each document of the unstructured textual news data based on the learned mapping function and the received vectorized representation.

In example embodiments, the classifier 1108 mapping function further determines and outputs a confidence value associated with the generated document description. The mapping function may similarly be trained to output the confidence value based on adjustments made in response to training data, where the confidence value is a representation of the degree of relatedness between the predicted document description and previous training examples identifying word vectors associated with labelled document descriptions.

In example embodiments, an example first unstructured textual news data set which has been fully processed and vectorized by the word vectorizer 1106, whereby 2589 headlines are represented by 1934 features, representing the TF-IDF score for different unigrams and bigrams are used to train the classifier 1108. The bag of words (e.g., the unique words) consists of approximately 67,323 different words. The first machine learning model 106 can be configured to extract about 650 news headlines with various document descriptions as a validation set. The rest of the data was used for training different classifiers using five-fold cross validation with stratified sampling.

Figure 14:
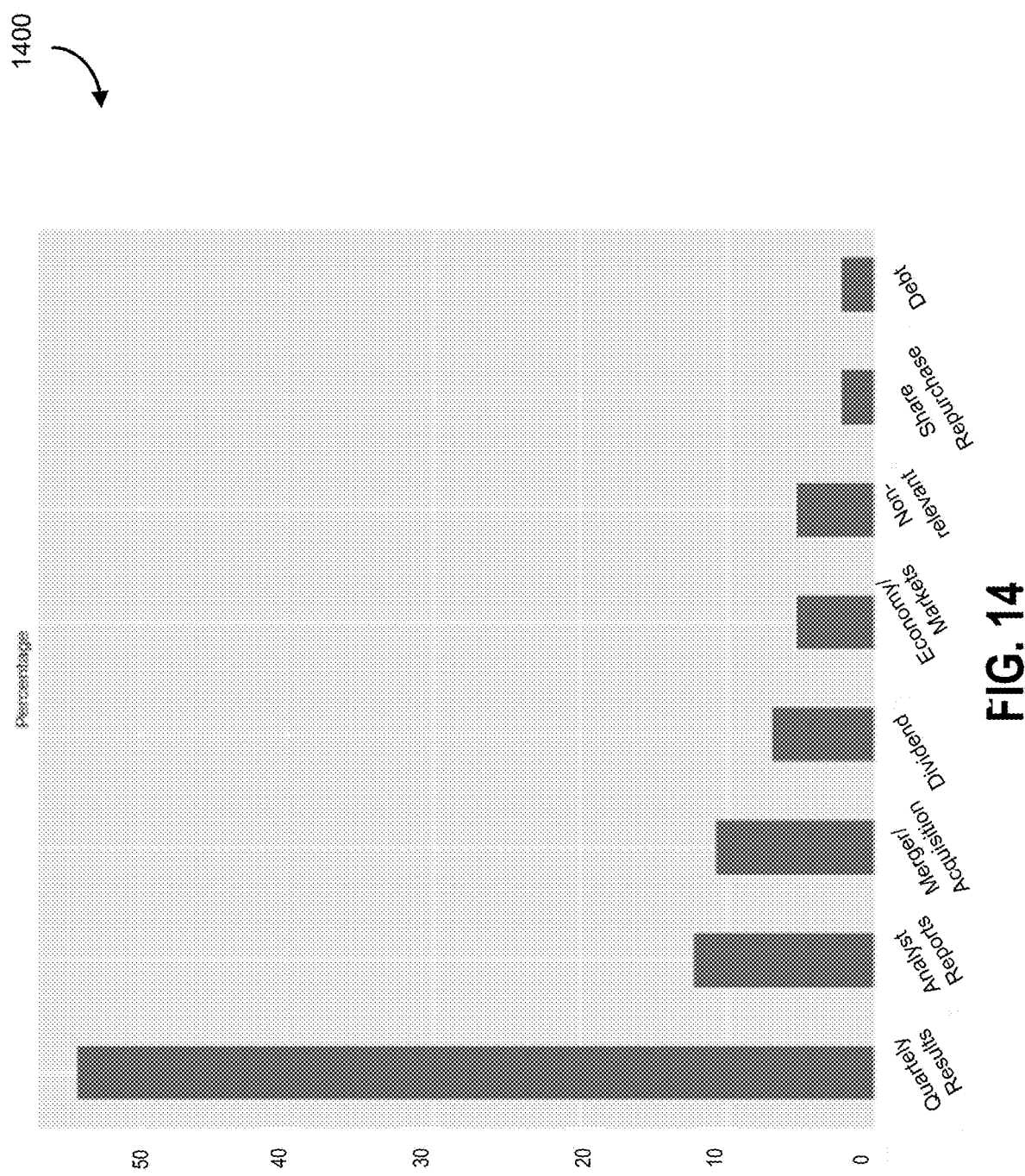
FIG. 14 is a bar graph of a frequency of classification in an example news data set, according to some embodiments.

Referring now to FIG. 14, an example graph 1400 of the frequency of a document description in the example first unstructured textual news data is shown. In the shown embodiment, for example, the news data set consists predominantly of documents which can be described as "quarterly results".

In example embodiments, the classifier 1108 mapping function can be determined by any one of a random forest classifier algorithm, a linear support vector machine algorithm, a multinomial naive Bayes algorithm, a logistic regression algorithm, a stochastic gradient descent linear support vector machine algorithm, or a nonlinear support vector machine algorithm.

Figure 15:
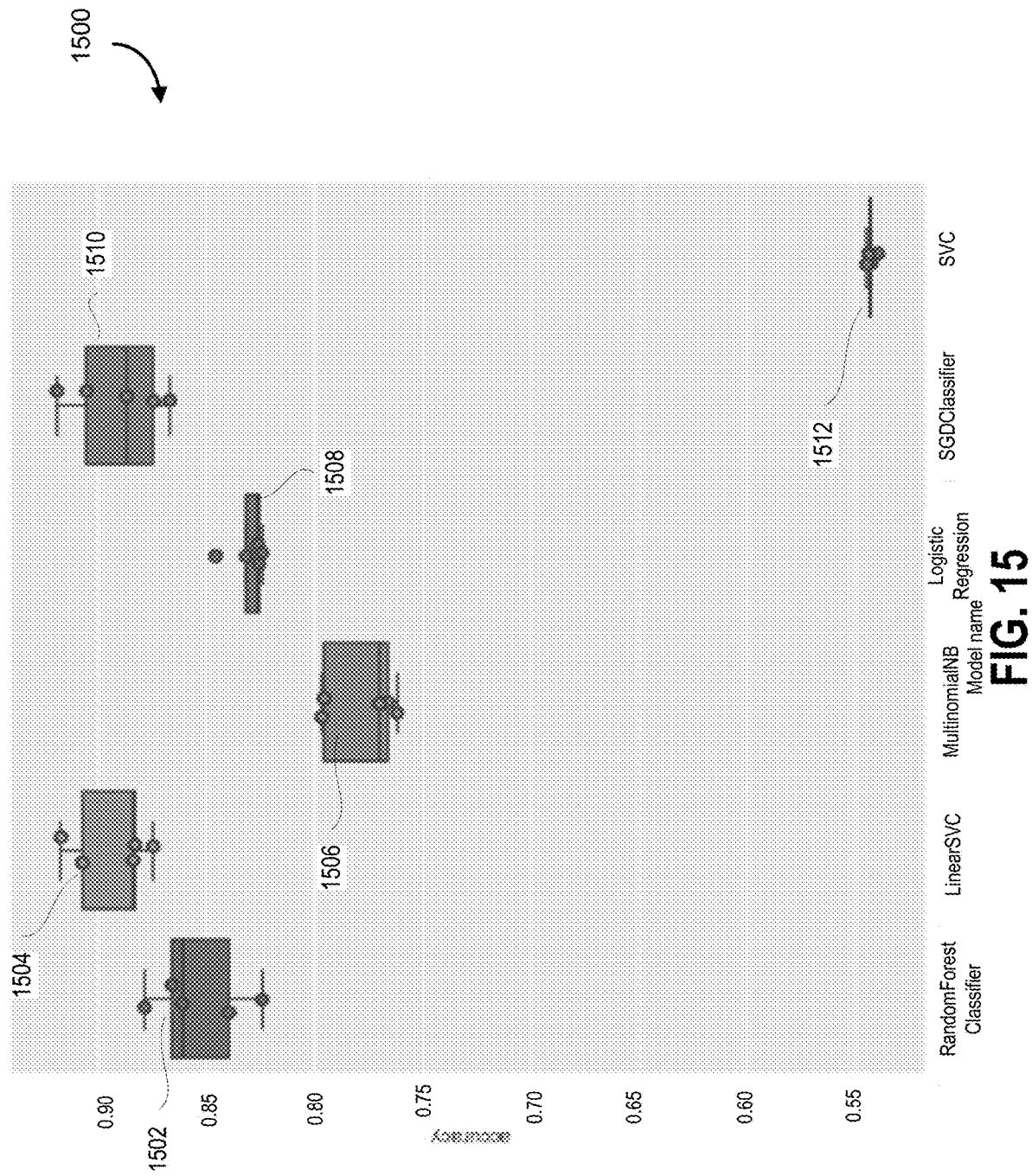
FIG. 15 is an example graph of mean accuracy of various classifiers classifying an example news data sets, according to some embodiments.

FIG. 15 is an example graph 1500 of mean accuracy of various classifiers 1108 classifying the example first unstructured textual news data. In graph 1500, the results of a random forest classifier 1502, a linear support vector machine 1504, a multinomial naive Bayes 1506, a logistic regression 1508, a stochastic gradient descent linear support vector machine 1510, or a nonlinear support vector machine 1512 processing the example first unstructured textual news data is shown. In the shown embodiment, classifiers 1108 were trained with default hyper parameters provided by the scikit-learn python machine learning package. As is shown in graph 1500, the highest mean accuracy achieved is 89.3779%, requiring less hyper parameter tuning.

In example embodiments, the classifier 1108 includes a plurality of mapping functions for interrelating vector representations with document descriptions to account for the bias within mapping function. For example, the classifier 1108 may include each of a random forest mapping function, a linear support vector machine mapping function, a multinomial naive Bayes mapping function, a logistic regression mapping function, a stochastic gradient descent linear support vector machine mapping function, or a nonlinear support vector machine mapping function, and aggregate the document descriptions generated by each of the mapping functions into the final document description (alternatively referred to as an ensemble approach). In some embodiments, for example, the classifier 1108 uses an ensemble approach with the top one or more (e.g., 5) performing mapping functions and takes the average of their document descriptions as the final document descriptions. This may ensure that bias and variance are effectively traded off. In example embodiments, with this approach, Applicants are able to produce a validating/testing accuracy of 89.66% and testing F1 score of 0.8933. In some embodiments, the classifier 1108 uses the predicted document description from the mapping function which has a highest degree of confidence in its prediction, or uses a weighted average of the various models.

Figure 16:
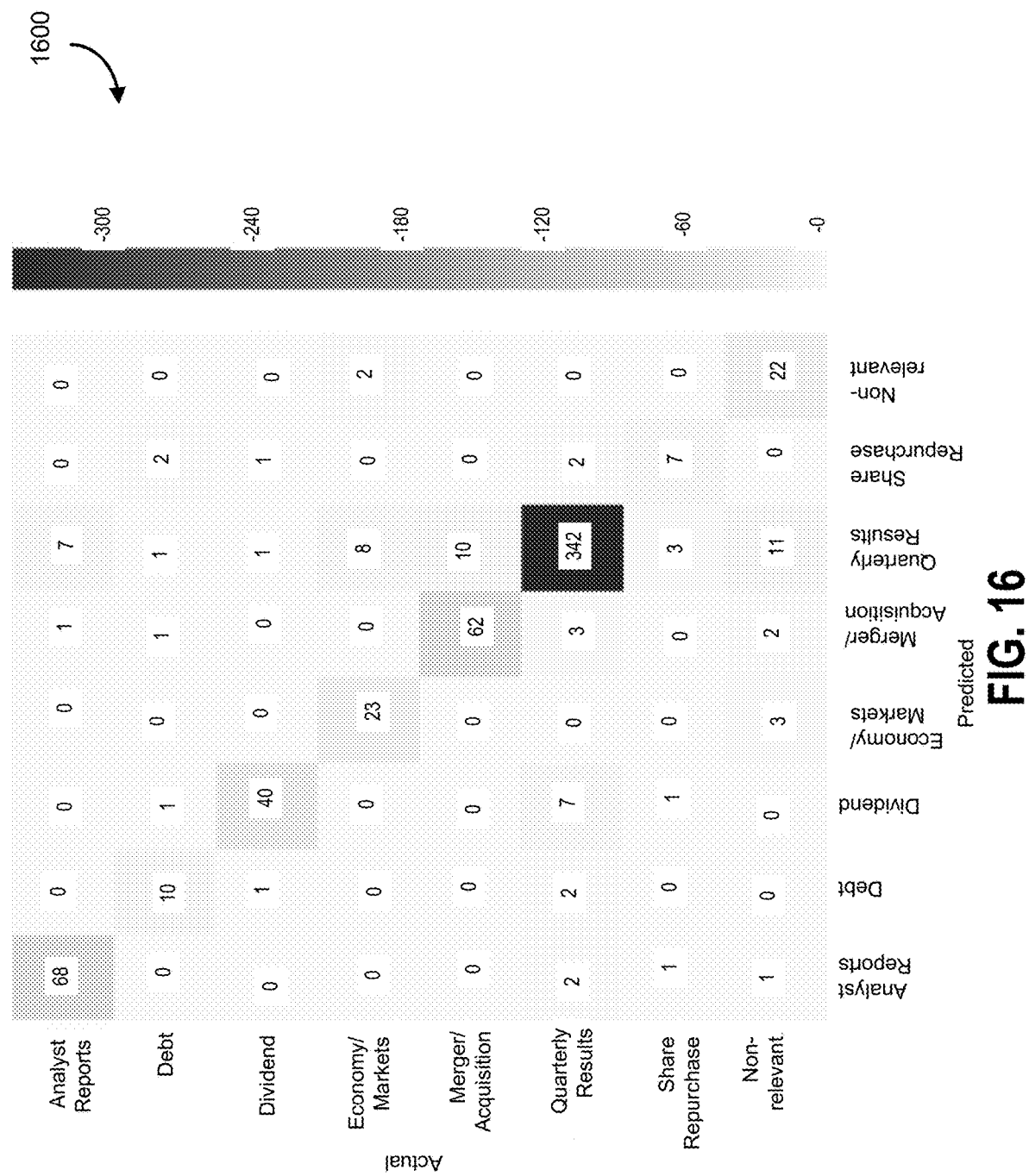
FIG. 16 is an example graph of the performance of an example classifier utilizing ensemble learning in predicting news data set document descriptions, according to some embodiments.

FIG. 16 shows an example graph 1600 of the performance of an example classifier 1108 utilizing the ensemble learning method in predicting unstructured textual news data set document descriptions.

FIG. 17 shows an example graph 1700 of the performance of classifier 1108 when the word vectorizer 1106 is a TF-IDF word vectorizer 1106. In the graph 1700, the testing accuracy was approximately 90%.

FIG. 18 shows an example graph 1800 of the performance of classifier 1108 when the word vectorizer 1106 utilizes a pre-existing word semantic interrelationship vector space, and specifically using Gensim, a pre-trained neural network for text vectorization, to vectorize words. In the graph 1800, classification using Gensim produces a testing accuracy of 75.65% and testing F1 score of 0.7658.

Figure 19A:
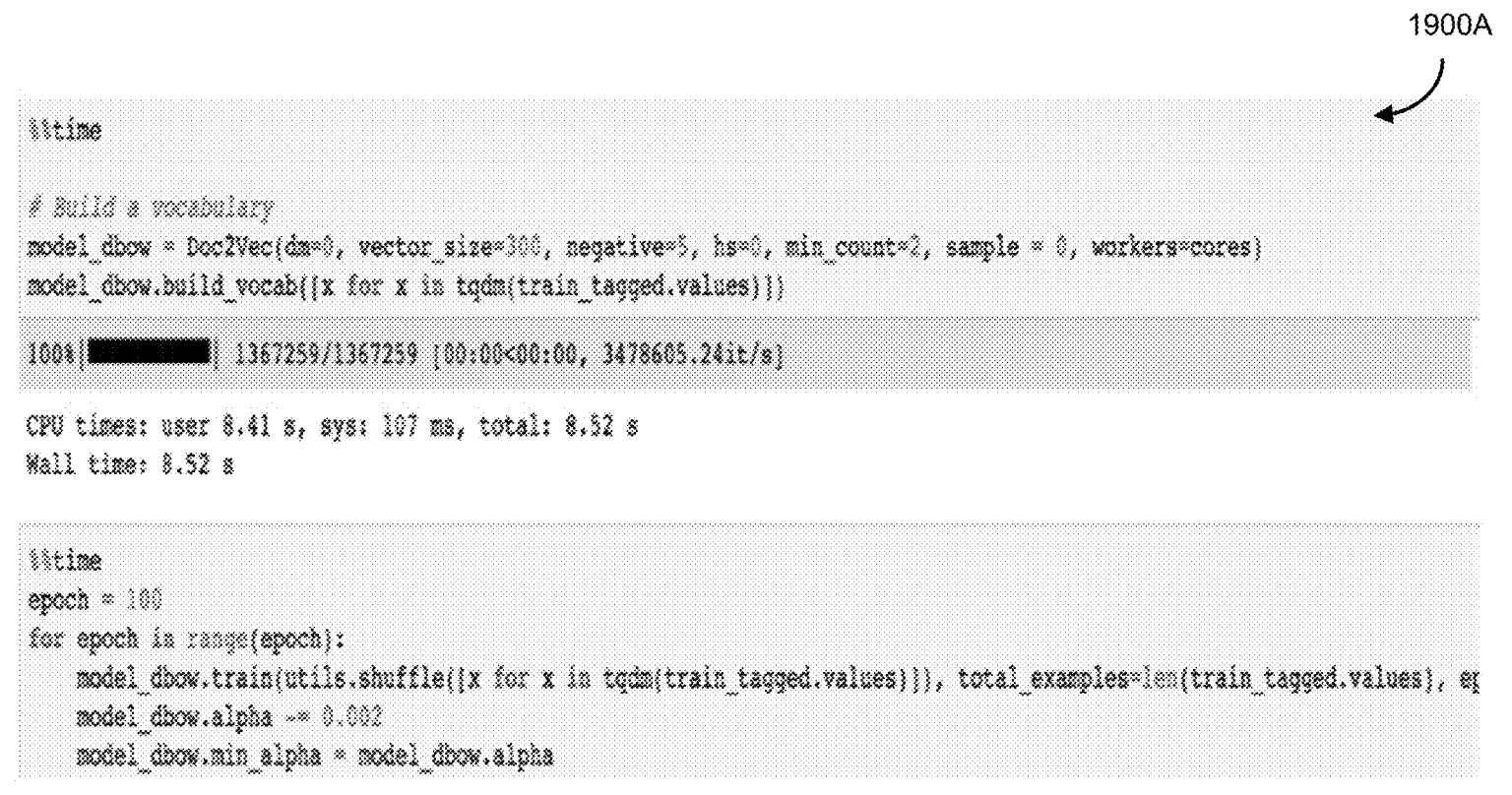

FIGS. 19A and 19B show an example implementation 1900A and 1900B of a Doc2Vec word vectorizer 1106 in Gensim. In the shown embodiment, the Doc2Vec word vectorizer 1106 trained for 100 epochs on the example new data set, with the minimum word count set to two in order to discard words with very few occurrences.

FIG. 20 shows an example graph 2000 of the performance of the Doc2Vec word vectorizer 1106 of FIGS. 19A and 19B. In the shown embodiment, with a simple logistic regression, Applicant observed that performance of the Doc2Vec word vectorizer 1106 is improved by another 15% with an accuracy of 75.58% and F1 score of 0.7558.

Another approach would be to collect more data and start tuning different combination of hyper parameters for each classifier 1108 type so that Applicants can achieve a better output overall.

In example embodiments, the first machine learning model includes one or more LSTM elements which are used to process the unstructured news textual data at any stage of processing. For example, the unstructured news textual data may be processed first with an LSTM before being processed by the TF-IDF algorithm, or before being processed by the sentiment analyzer 1112.

Referring again to FIG. 11, in example embodiments the sentiment analyzer 1112 is used to determine and output, at output 1114, whether the unstructured text data (e.g., the input classified by classifier 1108) includes positive or negative sentiment (i.e., good news or bad news).

The sentiment analyzer 1112 may be a pre-trained heuristic based sentiment analyzer, such as VADER (Valence Aware Dictionary and sEntiment Reasoner), specifically attuned to sentiments expressed in social media. For example, VADER uses a combination of a sentiment lexicona list of lexical features which are generally labeled according to their semantic orientation as either positive or negative. The sentiment analyzer 1112 may successfully classify news with strong economic driven signals such as quarterly results, analyst ratings, merger acquisition, share buyback or dividend payout, debt, etc. Success measurements during training can include both accuracy and F1 score where the data set is unbalanced.

The sentiment analyzer 1112 may not only determine and output whether the sentiment is positive or negative, but may also provide a sentiment score 1114 indicative of the magnitude of positivity or negativity. For example, the VADER sentiment analyzer 1112 not only reveals the positivity and negativity score but describes how positive or negative a sentiment is on a scale from −1 to 1.

The sentiment analyzer 1112 may aggregate the determined sentiment score for each document associated with the entity to determine an aggregated sentiment. For example, where there is a lot of press coverage associated with an industry related to the entity, the aggregate sentiment may reflect a large positive trend in the industry.

Utilizing the VADER sentiment analyzer 1112 may be time and resource efficient. For example, VADER does not require training data to begin with, is constructed from a generalizable, valence-based, human-curated standard sentiment lexicon, is fast enough to be used online with streaming data and works well across multiple domains.

In some embodiments, for example, Applicants tested the performance of VADER with classified news data sets including 6 million news headlines with sentiment labels, and produced a testing accuracy of 61.56% and testing F1 score of 0.6068.

Referring again to FIG. 1, the second machine learning model 108 is configured receive the, the future feature value, the classifier output (e.g., document description) 1110 and the sentiment output 1114.

In example embodiments, the second machine learning model 108 may be a semi-supervised, a supervised, or an unsupervised machine learning model. For example, the second machine learning model 108 may be semi-supervised, being trained with some training data that is labelled and unlabelled training data.

The second machine learning model 108 may be configured with a dichotomy-marking function defining one or more entity features associated with one or more future entity states. The dichotomy-marking function may be a boundary function, a support function, and include various precursor or auxiliary functions such as a kernel function.

The future entity state may be a capital funding opportunity, wherein the second machine learning model 108 determines whether the entity is likely to need services associated with raising capital. Some future entity states may be purposefully excluded by the second machine learning model 108, for example entity states which do not require services or which are irrelevant to capital funding opportunities.

The one or more entity features may be values generated by the first and first machine learning model, or the one or more entity features may be values/features which are unprocessed or processed with the preprocessing unit 118

(hereinafter referred to as the second data set). For example, the second data set may include some numerical time-series data, some unstructured textual news data, or various combinations thereof. Continuing the example, the second data set may include only unstructured textual news data, or only numerical time-series data, etc. In example embodiments, the preprocessing unit 118 pre-processes the second data prior to its incorporation into the second machine learning model 108. For example, analyst data (e.g., buy/sell recommendations) may be averaged prior to being incorporated into the second machine learning model 108.

The second data set may be incorporated along side entity features generated by the neural network 104 and the first machine learning model 106 by the second machine learning model 108 to generate the dichotomy-marking function. For example, analyst reports may be used in conjunction with the future feature value, the classifier output (e.g., document description) 1110 and the sentiment output 1114.

The one or more entity features can have one or more values representation a type of feature (e.g., analyst recommendation), and a magnitude (e.g., very negative analyst recommendation).

During training, the second machine learning model 108 is provided with a training data set including numerical time series data and unstructured textual news data processed by the first and first machine learning models, respectively, which are labelled as either having one or more entity features associated with one or more future entity states or not having one or more entity features associated with one or more future entity states. The second machine learning model 108 learns the dichotomy-marking function defining one or more entity features associated with one or more future entity states by processing the training data, other than the labelled data, and predicting whether the training data is indicative of future entity states. In response to determining the prediction is inaccurate (i.e., incorrectly labels the training data as being associated with the future entity states), the second machine learning model 108 updates the dichotomy-marking function. In this way, the second machine learning model 108 learns the dichotomy-marking function which most accurately defines one or more entity features associated with one or more future entity states.

The dichotomy-marking function may define one or more entity features associated with one or more future entity states based on one or more assumptions. For example, the dichotomy-marking condition may specify that certain amount of positive sentiment is required to determine that the future entity state is present. In another non-limiting example, the one or more predetermined assumptions may including the following assumptions:

Assumption 1: Firms will issue equity when their stock prices are high and either debt or no security when their stock prices are low.

Assumption 2: Firms will issue equity when the agreement parameter is high. Agreement parameter refers to the following: Company's ability to outperform analysts' estimates in earnings per share (EPS). Number of buy recommendations is higher than the number of sell recommendations. Consistent increase in holding position of top institutional investors/insiders.

Assumption 3: Firms will issue equity when there are strategic expansion/development plans; where processed news data and transaction data which correspond to the assumptions are indicative of capital funding opportunities.

In example embodiments, the one or more assumptions may be based on business textbooks, journals or other publications relevant to the prediction. For example, when predicting capital funding opportunities, the one or more assumptions may be based on Amy Dittma and Anjan Thakor's 2007 research titled, "Why Company Issue Equity."

Figure 21:
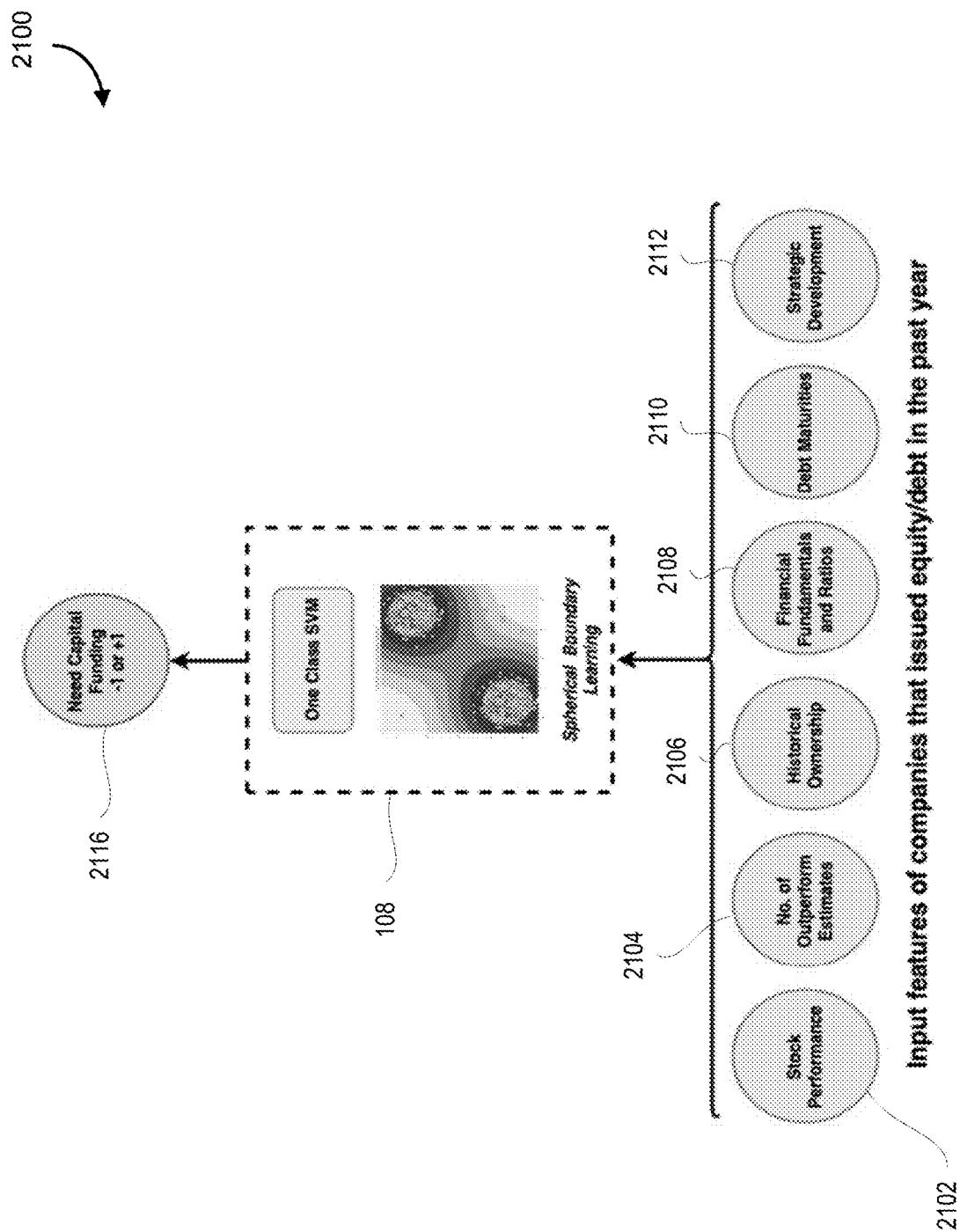
FIG. 21 is an example schematic diagram of an second machine learning model, according to some embodiments.

Referring now to FIG. 21, in example embodiments, the second machine learning model 108 uses a One-Class Support Vector Machine (OSVM) to define the dichotomy-marking function. The OSVM second machine learning model 108 separates received data points from the origin in a feature space and maximizes the distance from this hyperplane to the origin. This results in a binary dichotomy-marking function which obtains a spherical dichotomy-marking, in the feature space, around the input space of the probability density of the data. The dichotomy-marking function returns an output 2116, which may be +1 for input data within the spherical dichotomy-marking (capturing the training data points) and −1 elsewhere.

Training the OSVM second machine learning model 108 includes learning the distribution of the features associated with the spherical dichotomy-marking. For example, where the prediction is a future entity states, the OSVM second machine learning model 108 may be trained to establish a dichotomy-marking function (e.g., the spherical dichotomy-marking) based on labelled news and transaction data (i.e., one or more input entity features) which were associated with future entity states. For example, the OSVM second machine learning model 108 may be trained with news and transactional data (i.e., one or more input entity features) for all the companies that raised equity in the past (e.g., last year) to learn the dichotomy-marking function.

In example embodiments, during operation the OSVM second machine learning model 108 trains with one or more entity features including: stock performance data 2102 (e.g., the future feature data structure), the number of outperforming estimates data 2104 (e.g., the ratio of analyst buy to sell recommendations), the historical ownership data 2106 (e.g., the percentage of the entity stock owned by institutional investors), the financial fundamentals and ratios of the entity 2108, the debt maturity data 2110 (e.g., whether the entity has debt maturing within the next 6 months, year, etc.), and the strategic development data 2112 (e.g., the number of documents having document descriptions of "debt offering") of a particular entity, some of which it is noted include the outputs of the sentiment analyzer 1112 (not shown), the classifier 1108, to learn when to predict future entity states associated with the input features.

During operation, the OSVM second machine learning model 108 receives the outputs of the neural network and the first machine learning model as one or more input entity features. The OSVM second machine learning model 108 subsequently determines whether the one or more input entity features are sufficiently related to the one or more entity features associated with one or more future entity states defined by the dichotomy-marking function.

Determining whether the one or more input entity features are sufficiently related to the one or more entity features associated with one or more future entity states defined by the dichotomy-marking function may include determining whether the input entity features are within a threshold distance of the dichotomy-marking. For example, if the one or more input entity features are within a standard deviation of the dichotomy-marking function in the vector space associated with the dichotomy-marking function, said one or more input entity features may be sufficiently related. In example embodiments, if the one or more input entity features are within, or on a particular side of the dichotomy-marking function in the vector space associated with the dichotomy-marking function said one or more input entity features may be sufficiently related. Various means of determining sufficient relatedness are contemplated, including whether the dichotomy-marking function and the one or more input entity features are within a same region of the vector space.

Figure 22:
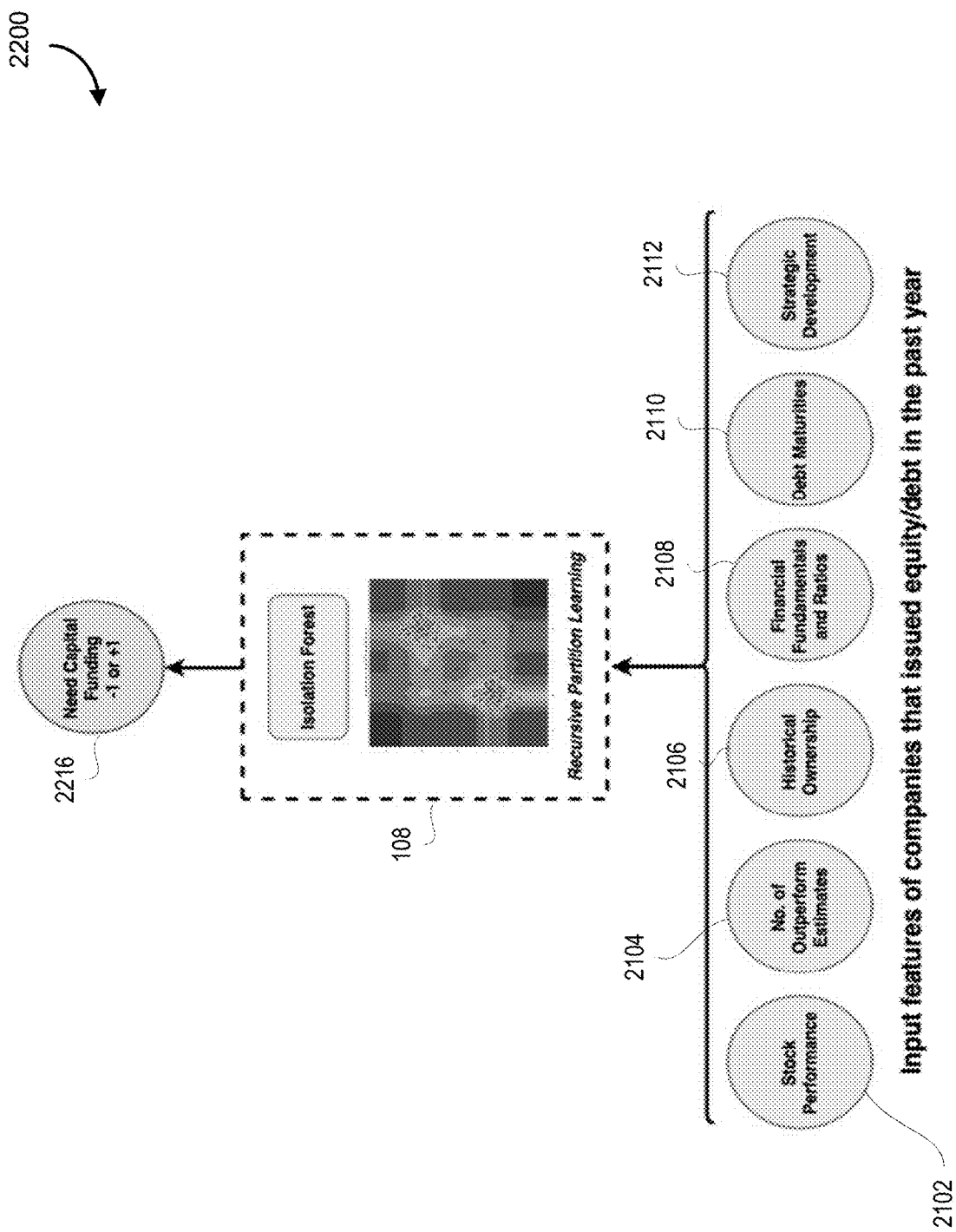
FIG. 22 is an example schematic diagram of another second machine learning model, according to some embodiments.

Referring now to FIG. 22, in example embodiments, the second machine learning model 108 utilizes an isolation forest algorithm to define the dichotomy-marking function. The isolation forest algorithm isolates observations by randomly selecting a feature and then randomly selecting a split value between the maximum and minimum values of the selected feature. Since recursive partitioning can be represented by a tree structure, the number of splittings required to isolate a sample is equivalent to the path length from the root node to the terminating node. This path length, averaged over a forest of such random trees, is a measure of normality and can be as the dichotomy-marking function (e.g., the dichotomy-marking is a particular path length). Random partitioning produces shorter paths for anomalies.

In example embodiments, the isolation forest second machine learning model 108 is trained with the processed financial news and numerical time-series data to identify branches associated with future entity states. For example, when the forest of random trees collectively produce higher path lengths for the training data labelled as being associated with the future entity state (e.g., likely to need/raise capital funding), said path lengths may be used to define the dichotomy-marking function. In another non-limiting example, the training may be based on data from Bloomberg for all the companies that had raised capital through equity in both US and Canadian markets during a designated time period.

In another non-limiting example embodiment, the isolation forest second machine learning model 108 is trained on companies sector by sector, so that the dichotomy-marking function is trained based on longer paths specifically associated with the industry the entity is operating in, making the model potentially more accurate.

In example embodiments, the isolation forest second machine learning model 108, similar to the OSVM second machine learning model 108, is trained with features which are correlated with the one or more entity features. For example, the isolation forest second machine learning model 108 can similarly be trained with the input stock performance data 2102, the number of outperforming estimates data 2104, the historical ownership data 2106, the financial fundamentals and ratios 2108, the debt maturity data 2110, and the strategic development data 2112 of a particular entity.

During operation, the isolation forest second machine learning model 108 receives the processed financial news and numerical time-series data from the sentiment analyzer 1112, the classifier 1108, and the neural network 104, and determines the path length associated with the received data. The isolation forest second machine learning model 108 utilizes the dichotomy-marking function to determine whether the determined path length is indicative of particular future entity states. In response to determining that the received data is within the dichotomy-marking function, or sufficiently related to the training data used to learn the dichotomy-marking function (e.g., a sufficient distance from the cluster of entity features defined by the dichotomy-marking function as exhibiting particular future entity states) the output 2216 indicates a future entity state, indicating that the received data is sufficiently related to the trained paths associated with future entity states used for training.

In example embodiments, during testing, Applicants kept about 10-15% of the sample data as a test set, used for validation. Both of the above techniques are referred as second-learning, and Applicants test models on real data and have a SME (Subject Matter Expert) to examine the findings generated from the models.

Table 2, below, shows the statistical conclusions along with qualitative factors associated with the models of system 102:

|  | MSE | F1 | Comp. expensive | Ease of Implement. |
| --- | --- | --- | --- | --- |
| LSTM 30D | less than 0.01 |  | ✓ |  |
| LSTM 252D | less than 0.11 |  | ✓ |  |
| Multi-Class |  | 0.8933 |  | ✓ |
| VADER |  | 0.60 |  | ✓ |
| LogReg w/Gensim |  | 0.7558 |  | ✓ |

A potential application of the system 102 is one where the system 102 collects static data from Bloomberg so that Applicants have a sufficient data sample to train novelty detection algorithms. This sample will allow the system to learn patterns of companies which previously issued more debt/equity in the past year. The experiment could be conducted in a second fashion, among others.

In example embodiments, the second machine learning model 108 may be a unsupervised density based algorithm DBSCAN.

Figure 23:
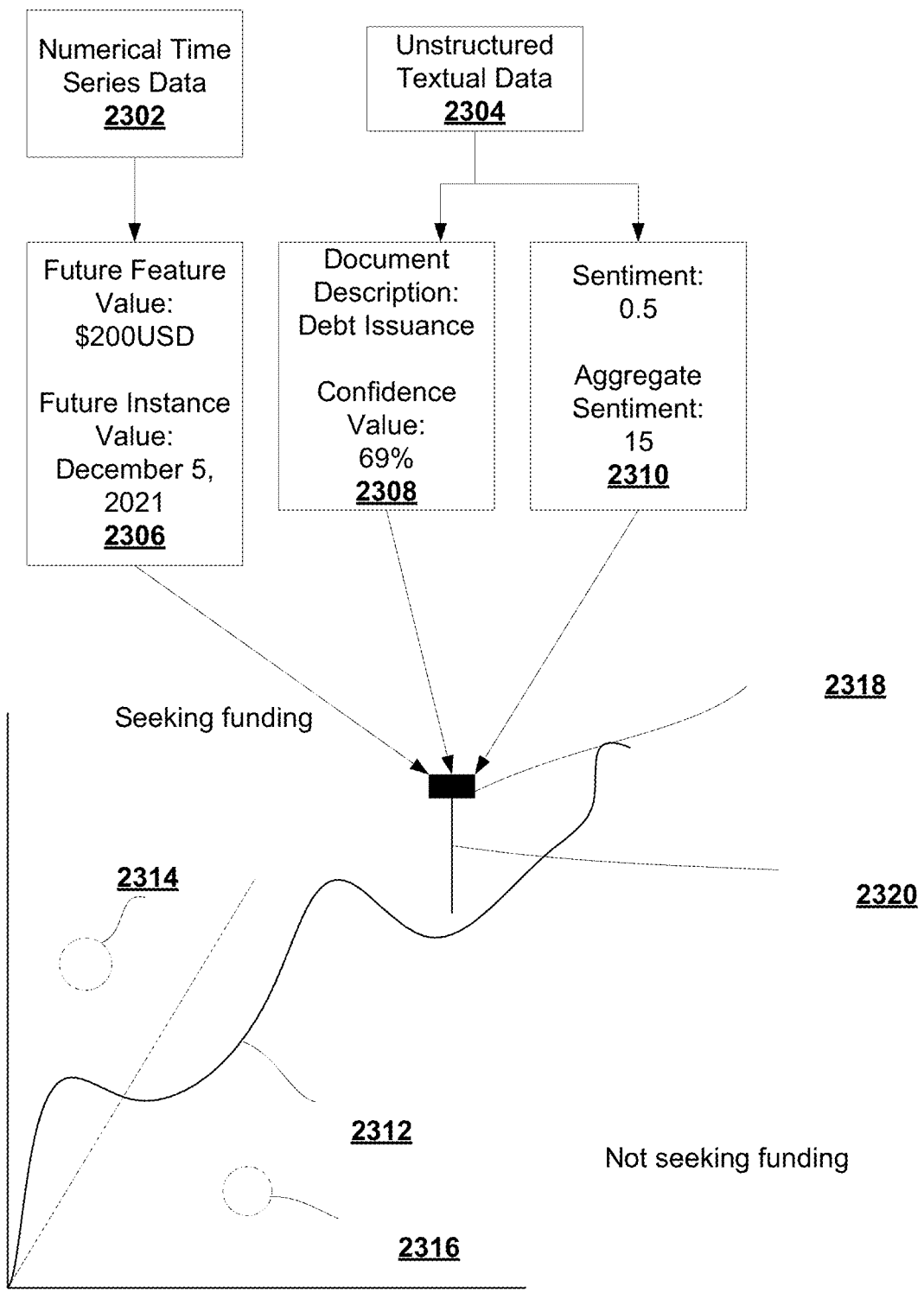
FIG. 23 shows a diagram of an example boundary dichotomy-marking function, according to example embodiments.

FIG. 23 shows a diagram 2300 of an example dichotomy-marking function, according to example embodiments.

Diagram 2300 shows numerical time-series data 2302 and the unstructured text data 2304 being used to generate (e.g., via the neural network 104 and the first machine learning model 106) an input representation including the future feature value and the future instance value 2306, the document description 2308, and the sentiment and the aggregate sentiment value 2310. Alternatively stated, the inputs to the second machine learning model 108 may be structured into an input vector representation of said inputs. For example, a first dimension of the input vector representation may be the future instance value 2306, the second dimension of the input vector representation may be the document description 2308, and so forth.

The input vector representation can be mapped onto a plurality of dichotomies. For example, the input vector representation may be mapped into a vector space defined by the inputs which constitute the input vector representation (e.g., a vector space having a separate axis for each consistent input of the input vector representation). In some embodiments, the input vector representation is processed to be mapped onto a higher or lower dimension plane. For example, the input vector representation may be processed with a kernel function into a higher dimensional plane to allow for dichotomy partitioning of the higher dimensional plane having a greater plurality of dichotomies.

The dichotomy-marking function 2312 (e.g., a boundary function), is shown as a three dimensional function. The dichotomy-marking function 2312 can reside in as many dimensions as there dimensions to the dichotomy representation, or stated alternatively, as many inputs as are being provided to the second machine learning model 108.

The dichotomy-marking function 2312 may define a dichotomy, vector space, plane, or area associated with a series of training input vector representations labelled as being associated with the future entity states, or alternatively stated one or more solution dichotomies. In the shown embodiment, the training input vector representation labelled as being associated with the future entity states are shown by cluster 2314 (e.g., one or more solution dichotomies), and the input vector representations labelled as not being associated with the future entity states are shown by cluster 2316. During operation, a mapping of an input vector representation of the input values (e.g., the future feature value) into the plurality of dichotomies associated with the dichotomy-marking function 2312 which are on the same side of the as cluster 2314 may be determined to be sufficiently related to the one or more solution dichotomies, and therefore associated with the future entity states within the one or more solution dichotomies. In the shown embodiments, the input vector representations including the future feature value and the future instance value 2306, the document description 2308, and the sentiment and the aggregate sentiment value 2310, when mapped into the plurality of dichotomies associated with the dichotomy-marking function 2312 (shown as point 2318) are sufficiently related to the to the one or more solution dichotomies defined by the dichotomy-marking function 2312 because they are within a threshold distance of the dichotomy-marking function 2312.

In example embodiments, whether the input vector representations are sufficiently related to the to the one or more solution dichotomies based on a distance 2320 from the input vector representations (e.g., input vector representation 2318) to the dichotomy-marking function 2312. For example, where the input vector representation 2318 is more than one standard deviation length (e.g., determined based on the training data) from the dichotomy-marking function 2312, the input vector representation 2318, and may be determined not to be sufficiently related to, or within the one or more solution dichotomies of the plurality of dichotomies.

Figure 24:
FIG. 24 is a diagram of a sample dashboard rendered on a graphical user interface, according to some embodiments.

FIG. 24 is a diagram 2400 of a sample dashboard rendered on a graphical user interface, according to some embodiments outputting the results of one or more of the models discussed herein.

Figure 25:
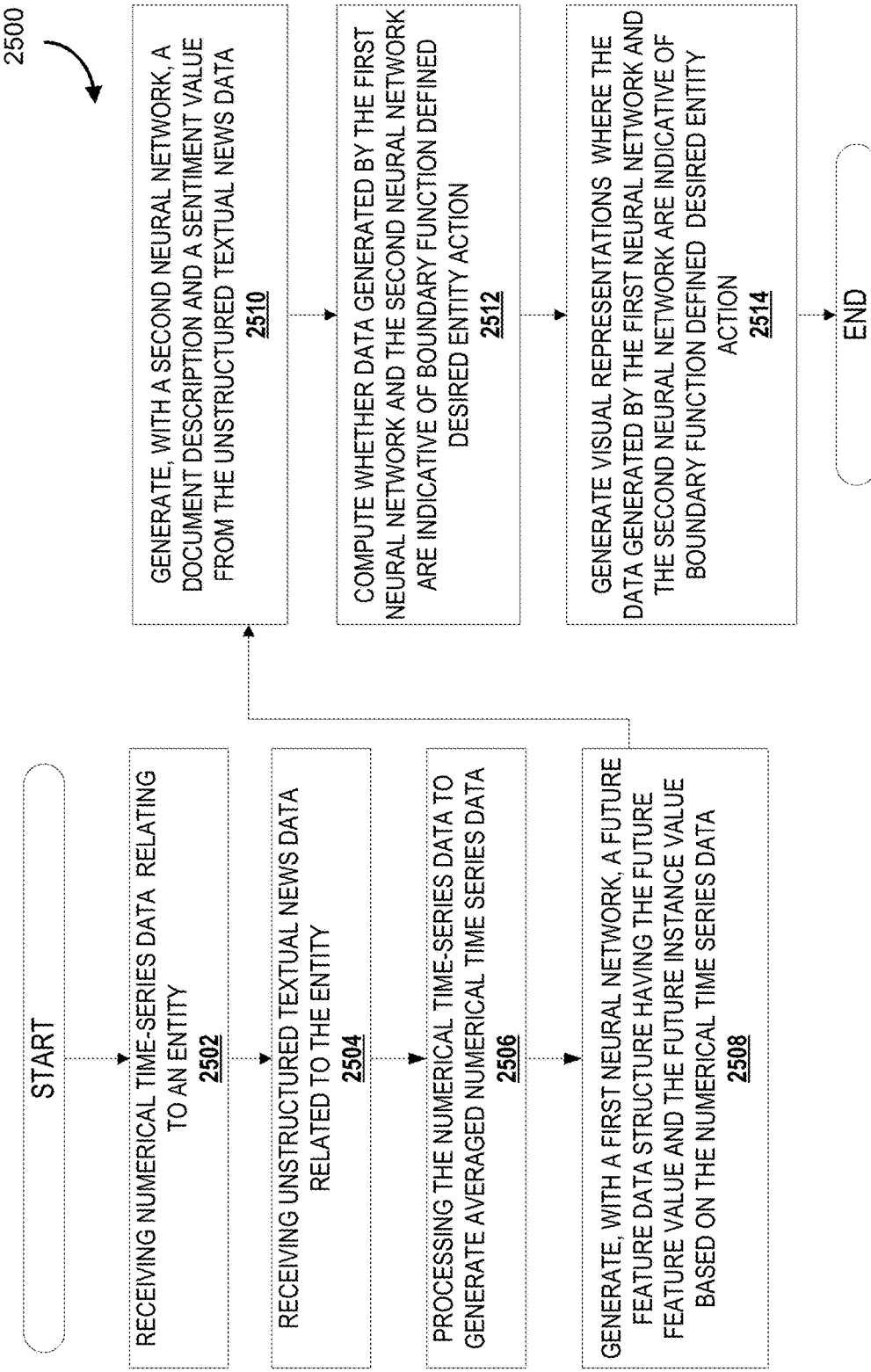
FIG. 25 is an example process flow diagram for a method for automatically generating future entity states, according to some embodiments.

FIG. 25 is an example method diagram 2500 for second learning, according to some embodiments.

At step 2502, numerical time-series data relating to an entity including a plurality of feature data structures, each feature data structure including a feature value and an instance value, is received.

At step 2504, unstructured textual news data associated with the entity, including one or more documents having one or more words, is received.

At step 2506, the numerical time-series data is processed to generate averaged numerical time series data exhibiting long term dependencies.

At step 2508, the neural network 104 generates the future feature data structure having the future feature value and the future instance value for the numerical time-series data by transforming one or more feature data structures within the numerical time-series data and one or more feature data structures of the averaged numerical time-series data into a latent feature representation with the first LSTM layer, and processing the latent feature representation with the second LSTM layer to transform the latent feature representation into the future feature value and generate the future instance value.

At step 2510, the first machine learning model 106 generates document descriptions and extracts sentiment from unstructured textual news data.

At step 2512, the second neural network 108 receives the aggregated sentiment score, the document description, and the future instance value and utilizes a boundary function to compute whether the received aggregated sentiment score, the document description, and the future instance value coincides the boundary function defined features associated with one or more future entity states.

At step 2514, one or more visual representations are generated in response to determining the received aggregated sentiment score, the document description, and the future instance value coincide with the boundary function defined features associated with one or more future entity states.

Where method 2500 includes a single combination of steps, various possible combination of the disclosed steps, in various orders and containing various subsets of the disclosed steps, are contemplated. For example, step 2502 may occur prior to, or simultaneously with step 2504, step 2508 may occur simultaneously with step 2510, and so forth. For further clarification, if one embodiment comprises steps A, B, and C, and a second embodiment comprises elements B and D, then the application is also considered to include other remaining combinations of A, B, C, or D, even if not explicitly disclosed.

Figure 26:
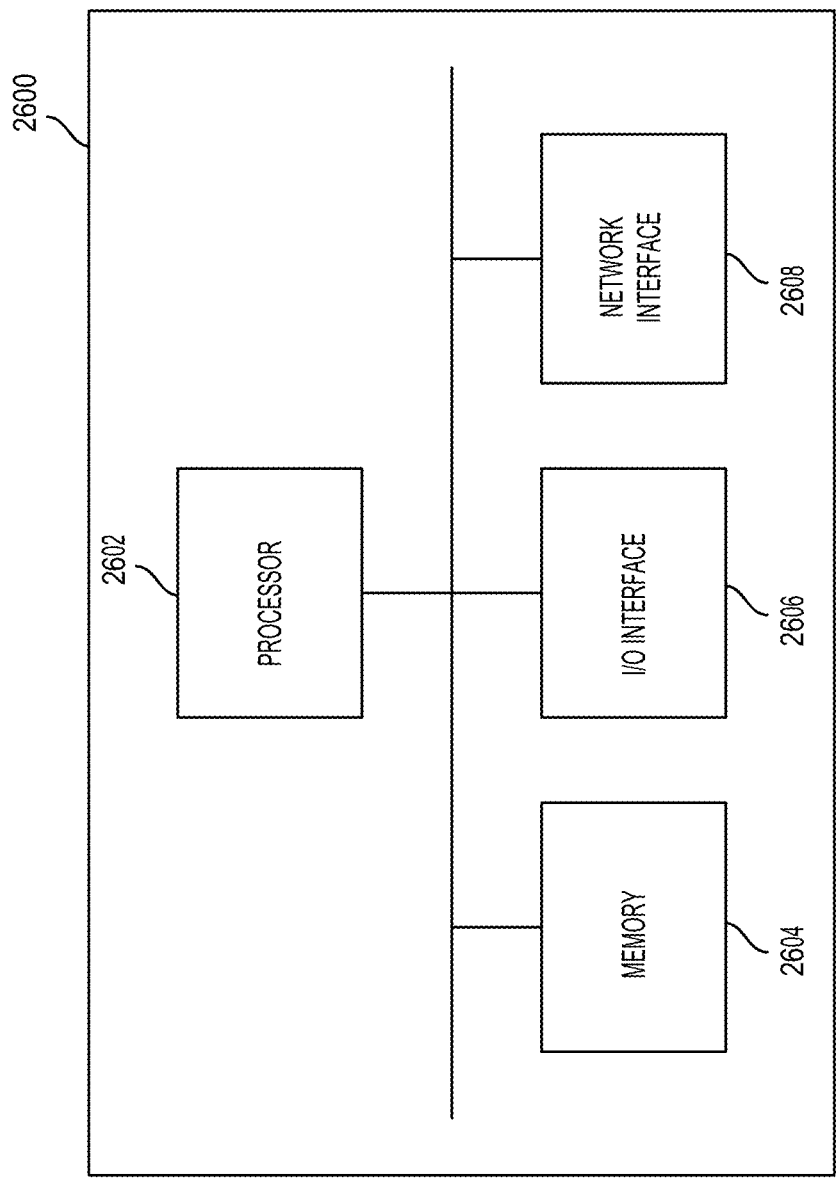
FIG. 26 is a diagram of an example computing device, according to some embodiments.

FIG. 26 is a schematic diagram of computing device 2600 which may be used to implement system 102, in accordance with an embodiment.

As depicted, computing device 2600 includes at least one processor 2602, memory 2604, at least one I/O interface 2606, and at least one network interface 2608.

Each processor 2602 may be, for example, a microprocessor or microcontroller (e.g., a special-purpose microprocessor or microcontroller), a digital signal processing (DSP) processor, an integrated circuit, a field programmable gate array (FPGA), a reconfigurable processor, a non-transitory computer programmable read-only memory (PROM), or various combinations thereof.

Memory 2604 may include a suitable combination of various types of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM).

Each I/O interface 2606 enables computing device 2600 to interconnect with one or more input devices, such as a keyboard, mouse, camera, touch screen and a microphone, or with one or more output devices such as a display screen and a speaker.

Each network interface 2608 enables computing device 2600 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including various combinations of these.

For simplicity only, one computing device 2600 is shown but server 262 may include multiple computing devices 2600. The computing devices 2600 may be the same or different types of devices. The computing devices 2600 may be connected in various ways including directly coupled, indirectly coupled via a network, and distributed over a wide geographic area and connected via a network (which may be referred to as "cloud computing").

For example, and without limitation, a computing device 2600 may be a server, network appliance, set-top box, embedded device, computer expansion module, personal computer, laptop, personal data assistant, cellular telephone, smartphone device, UMPC tablets, video display terminal, gaming console, or various other computing device capable of being configured to carry out the methods described herein.

In some embodiments, a computing device 2600 may function as the user device 114, or data source(s) 116.

In some embodiments, each of the neural network 104, first machine learning model 106, second machine learning model 108, preprocessing unit 118 including, RNN layers, word vectorizer 1106, and classifier 1108 are a separate computing device 2600. In some embodiments, the neural network 104, first machine learning model 106, second machine learning model 108, preprocessing unit 118 including, RNN layers, word vectorizer 1106, and classifier 1108 are operated by a single computing device 2600 having a separate integrated circuit for each of the said components. Various combinations of software and hardware implementation of the neural network 104, first machine learning model 106, second machine learning model 108, preprocessing unit 118 including, RNN layers, word vectorizer 1106, and classifier 1108 may be implemented, for example, part of the component may be on a special purpose hardware operating a special purpose application which is connected to the system 102. In some embodiments, these components of system 102 may be in the form of one or more executable programs, scripts, routines, statically/dynamically linkable libraries.

REFERENCES

F. Zhao. Natural Language Processing—Primer: Part I and II. SP Global-Market Intelligence—Quantamental Research. 2018.

V. Iosifidis, E. Ntoutsi. Large Scale Sentiment Learning with Limited Labels. 2017.

M. Kusner, Y. Sun, N. Kolkin, K. Weinberger. From Word Embeddings To Document Distances. 2015.

J. Howard, S. Ruder. Universal Language Model Fine-tuning for Text Classification. 2018.

R. Akita, A. Yoshihara, T. Matsubara, K. Uehara. Deep Learning for Stock Prediction using Numerical and Textual Information. 2018.

D. Torres, H. Qiu. Applying Recurrent Neural Networks for Multivariate Time Series Forecasting of Volatile Financial Data. 2018.

A. Gron. Hands-On Machine Learning with Scikit-Learn TensorFlow. 2017.

J. Alberg, Z. Lipton. Improving Factor-Based Quantitative Investing by Forecasting Company Fundamentals. 2018.

S. Hariri, M. Kind. Isolation Forest for Anomaly Detection. 2018.

G. Jacobs, E. Lefever and V. Hoste. Economic Event Detection in Company-Specific News Text. 2017.

A. Dittmar and A. Thakor. Why Do Firms Issue Equity. 2007.

M. Prado. Advances in Financial Machine Learning. 2018.

L. Solberg J. Karlsen. The Predictive Power of Earnings Conference Calls (Thesis). 2018.

J. Rosenbaum, J. Pearl, J. Perella, J. Harris. Investment Banking: Valuation Leveraged Buyouts, and Mergers and Acquisitions. 2013.

P. Goyal, S. Pandey, K. Jain. Deep Learning for Natural Language Processing. 2018.

F. Liu, K. Ting, Z. Zhou. Isolation Forest. 2009.

Applicant notes that the described embodiments and examples are illustrative and non-limiting. Practical implementation of the features may incorporate a combination of some or every one of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A computer implemented system, the system comprising:
   one or more computer processors operating in conjunction with a computer memory and non-transitory computer readable media, the one or more processors configured to:
   receive numerical time-series data relating to an entity including a plurality of feature data structures, each feature data structure including a feature value and an instance value;
   receive unstructured textual news data relating to the entity including one or more documents having one or more words;
   process the numerical time-series data to generate averaged numerical time series data exhibiting long term dependencies;
   maintain a model architecture including a neural network, a first machine learning model, and a second machine learning model;
   the neural network trained to generate a future feature data structure having a future feature value and a future instance value for numerical time-series data, the neural network including a first RNN layer and a second RNN layer:
      the first RNN layer configured to receive the numerical time-series data and the averaged numerical time series data and to transform one or more feature data structures within the received numerical time-series data and one or more feature data structures of the received averaged numerical time-series data into a latent feature representation; and the second RNN layer configured to receive the latent feature representation and trained to transform the received latent feature representation into the future feature value and the future instance value; and the first machine learning model trained to generate document descriptions and extract sentiment from the unstructured textual news data:

the first machine learning model configured to receive the unstructured textual news data and trained to generate a vectorized representation of each document within the unstructured textual news data by structuring the vectorized representation with a term frequency and inverse document frequency (TF-IDF) value for each unique word within each document;

the first machine learning model trained with a mapping function interrelating vector representations and document descriptions, the first machine learning model configured to generate a document description of each document of the unstructured textual news data based on the mapping function and the generated vectorized representation;

the first machine learning model generating from the unstructured textual news data, with a pre-trained heuristic sentiment analyzer, a sentiment score for each document in the unstructured textual news data; and the first machine learning model aggregating the sentiment score into an aggregated sentiment score for the unstructured textual news data relating to the entity; and the second machine learning model having a trained dichotomy-marking function, the trained dichotomy-marking function trained to define one or more solution dichotomies within a plurality of dichotomies defined in part by document descriptions, aggregated sentiment scores, future feature values and future instance values, the second machine learning model configured to:

receive the aggregated sentiment score, the document description, the future feature value and the future instance value; and determine whether the aggregated sentiment score, the document description, the future feature value and the future instance value map onto the one or more solution dichotomies; and generate one or more future entity state data structures having the future entity states associated with the one or more solution dichotomies in response to determining the aggregated sentiment score, the document description, the future feature value and the future instance value map onto the one or more solution dichotomies.

2. The system of claim 1, wherein the first RNN layer and the second RNN layer are long short-term memory (LSTM) layers, the first RNN layer having a long term state representation and a hidden state representation, the first RNN layer configured to:

transform one or more feature data structures within the numerical time-series data and one or more feature data structures of the averaged numerical time-series data into a first state representation;

in response to determining at the long term state representation should be forgotten based on the first state representation and the hidden state representation, updating the long term state representation; and in response to determining the first state representation and the hidden state representation should be added to the long term state representation, updating the updated long term state representation;

determine the latent representation based on combining the updated updated long term state representation and at the first state representation and the hidden state representation; and output the latent state representation; and the second RNN layer having a second long term state representation, and a second hidden state representation, the second RNN layer configured to:

transform the latent representation into a second state representation;

in response to determining the second long term state representation should be forgotten based on the second state representation and the second hidden state representation, updating the second long term state representation; and in response to determining the second state representation and the second hidden state representation should be added to the second long term state representation, updating the updated second long term state representation;

determine the future feature value and the future instance value based on the updated updated second long term state representation and the second state representation and the second hidden state representation; and output the future feature value.

3. The system of claim 2, wherein the first RNN layer and the second RNN layer include 65 neurons, and are tuned with: a learning rate of 0.01, a Lambda l2 regularization parameter of 0.003 and a gradient clipping parameter of 2.5, an Adam optimization function, and a ReLu activation function.

4. The system of claim 1, wherein the neural network further determines a tolerance interval associated with the numerical time-series data, and generates an alert in response to determining that the future instance value does not satisfy the determined tolerance interval.

5. The system of claim 1, wherein:

the first machine learning model generates the vectorized representation of each document within the unstructured textual news data by structuring the vectorized representation with a bigram term frequency and inverse document frequency (TF-IDF) value and a unigram term frequency and inverse document frequency (TF-IDF) value of each unique bigram and unigram in each document in the unstructured textual news data;

the mapping function interrelates vector representations of unigrams and vector representations of bigrams with document descriptions; and the first machine learning model generates the document description of each document of the unstructured textual news data based on the mapping function interrelating vector representations of unigrams and vector representations of bigrams with document descriptions and the generated vectorized representation.

6. The system of claim 1, wherein the first machine learning model comprises:

a plurality of mapping functions for interrelating vector representations with document descriptions;

wherein the first machine learning model generates a plurality of document descriptions of each document of the unstructured textual news data based on each of the plurality of mapping functions; and wherein the first machine learning model aggregates the plurality of generated document descriptions into the document description.

7. The system of claim 6, wherein:

the plurality of mapping functions comprises five mapping functions;

wherein the first machine learning model generates five document descriptions of each document of the unstructured textual news data based on each of the five mapping functions; and wherein the first machine learning model aggregates the five generated document descriptions into the document description.

8. The system of claim 1, one or more processors further configured to:

receive a second data set having a second numerical time series data or a second unstructured textual data;

populate the one or more input entity features with the second data set;

wherein the dichotomy-marking function further defines one or more entity features related to the second data set which are associated with the one or more future entity states.

9. The system of claim 1, wherein the mapping function interrelates vector representations with document descriptions indicative of an irrelevant news data, and the first machine learning model is configured to discard the unstructured textual news data associated with document descriptions indicative of the irrelevant news data.

10. The system of claim 1, wherein:

the first machine learning model is trained with a learned probability distribution of predicting paragraph representations from randomly-sampled words within paragraphs;

the first machine learning model is configured to generate one or more paragraph descriptions for each document based on the learned probability distribution; and the pre-trained heuristic sentiment analyzer extracts the sentiment score based on the generated one or more paragraph descriptions.

11. The system of claim 1, wherein the numerical time series data is a stock price, and a trading volume, the averaged numerical time series data is a 30 day averaged or a 252 day averaged stock price, and a 30 day averaged or a 252 averaged trading volume, the future instance value is a predicted 30 day averaged or a predicted 252 day averaged stock price, the document description is a topic, the sentiment score is a normalized sentiment score, the one or more future entity states include likely to raise funds state and a likely to issue debt state.

12. A method comprising:

receiving numerical time-series data relating to an entity including a plurality of feature data structures, each feature data structure including a feature value and an instance value;

receiving unstructured textual news data relating to the entity including one or more documents having one or more words;

processing the numerical time-series data to generate averaged numerical time series data exhibiting long term dependencies;

maintaining a model architecture including a neural network, a first machine learning model, and a second machine learning model;

the neural network trained to generate a future feature data structure having a future feature value and a future instance value for numerical time-series data, the neural network including a first RNN layer and a second RNN layer:

the first RNN layer configured to receive the numerical time-series data and the averaged numerical time series data and to transform one or more feature data structures within the received numerical time-series data and one or more feature data structures of the received averaged numerical time-series data into a latent feature representation; and the second RNN layer configured to receive the latent feature representation and trained to transform the received latent feature representation into the future feature value and the future instance value; and the first machine learning model trained to generate document descriptions and extract sentiment from the unstructured textual news data:

the first machine learning model configured to receive the unstructured textual news data and trained to generate a vectorized representation of each document within the unstructured textual news data by structuring the vectorized representation with a term frequency and inverse document frequency (TF-IDF) value for each unique word within each document;

the first machine learning model trained with a mapping function interrelating vector representations and document descriptions, the first machine learning model configured to generate a document description of each document of the unstructured textual news data based on the mapping function and the generated vectorized representation;

the first machine learning model generating from the unstructured textual news data, with a pre-trained heuristic sentiment analyzer, a sentiment score for each document in the unstructured textual news data; and the first machine learning model aggregating the sentiment score into an aggregated sentiment score for the unstructured textual news data relating to the entity; and the second machine learning model having a trained dichotomy-marking function, the trained dichotomy-marking function trained to define one or more solution dichotomies within a plurality of dichotomies defined in part by document descriptions, aggregated sentiment scores, future feature values and future instance values, the second machine learning model configured to:

receive the aggregated sentiment score, the document description, the future feature value and the future instance value; and determine whether the aggregated sentiment score, the document description, the future feature value and the future instance value map onto the one or more solution dichotomies; and generating one or more future entity state data structures having the future entity states associated with the one or more solution dichotomies in response to determining the aggregated sentiment score, the document description, the future feature value and the future instance value map onto the one or more solution dichotomies.

13. The method of claim 12, wherein the first RNN layer and the second RNN layer are long short-term memory (LSTM) layers, the first RNN layer having a long term state representation and a hidden state representation, the first RNN layer configured to:
- transform one or more feature data structures within the numerical time-series data and one or more feature data structures of the averaged numerical time-series data into a first state representation;
- in response to determining the long term state representation should be forgotten based on the first state representation and the hidden state representation, updating the long term state representation; and
- in response to determining the first state representation and the hidden state representation should be added to the long term state representation, updating the updated long term state representation;
- determine the latent representation based on combining the updated updated long term state representation and the first state representation and the hidden state representation; and
- output the latent state representation; and the second RNN layer having a second long term state representation, and a second hidden state representation, the second RNN layer configured to:
- transform the latent representation into a second state representation;
- in response to determining the second long term state representation should be forgotten based on the second state representation and the second hidden state representation, updating the second long term state representation; and
- in response to determining the second state representation and the second hidden state representation should be added to the second long term state representation, updating the updated second long term state representation;
- determine the future feature value and the future instance value based on the updated updated second long term state representation and the second state representation and the second hidden state representation; and
- output the future feature value.

14. The method of claim 13, wherein the first RNN layer and the second RNN layer include 65 neurons, and are tuned with: a learning rate of 0.01, a Lambda 12 regularization parameter of 0.003 and a gradient clipping parameter of 2.5, an Adam optimization function, and a ReLu activation function.

15. The method of claim 12, wherein the neural network further determines a tolerance interval associated with the numerical time-series data, and generates an alert in response to determining that the future instance value does not satisfy the determined tolerance interval.

16. The method of claim 12, wherein:
- the first machine learning model generates the vectorized representation of each document within the unstructured textual news data by structuring the vectorized representation with a term frequency and inverse document frequency (TF-IDF) of each unique bigram and unigram in each document in the unstructured textual news data;
- the mapping function interrelates vector representations of unigrams and bigrams with document descriptions; and
- the first machine learning model generates the document description of each document of the unstructured textual news data based on the mapping function interrelating vector representations of unigrams and bigrams with document descriptions and the generated vectorized representation.

17. The method of claim 12, wherein the first machine learning model comprises:
- a plurality of mapping functions for interrelating vector representations with document descriptions;
- wherein the first machine learning model generates a plurality of document descriptions of each document of the unstructured textual news data based on each of the plurality of mapping functions; and
- wherein the first machine learning model aggregates the plurality of generated document descriptions into the document description.

18. The method of claim 12, further comprising:
- receive a second data set having a second numerical time series data or a second unstructured textual data;
- wherein the dichotomy-marking function further defines one or more entity features related to the second data set which are associated with the one or more future entity states.

19. The method of claim 12, wherein the mapping function interrelates vector representations with document descriptions indicative of an irrelevant news data, and the first machine learning model is configured to discard the unstructured textual news data associated with document descriptions indicative of the irrelevant news data.

20. A non-transitory computer readable medium storing machine interpretable instructions which when executed by a processor, cause the processor to execute a method for visualizing future entity states, the method comprising:
- receiving numerical time-series data relating to an entity including a plurality of feature data structures, each feature data structure including a feature value and an instance value;
- receiving unstructured textual news data relating to the entity including one or more documents having one or more words;
- processing the numerical time-series data to generate averaged numerical time series data exhibiting long term dependencies;
- maintaining a model architecture including a neural network, a first machine learning model, and a second machine learning model;
- the neural network trained to generate a future feature data structure having a future feature value and a future instance value for numerical time-series data, the neural network including a first RNN layer and a second RNN layer:
  - the first RNN layer configured to receive the numerical time-series data and the averaged numerical time series data and to transform one or more feature data structures within the received numerical time-series data and one or more feature data structures of the received averaged numerical time-series data into a latent feature representation; and
  - the second RNN layer configured to receive the latent feature representation and trained to transform the received latent feature representation into the future feature value and the future instance value; and the first machine learning model trained to generate document descriptions and extract sentiment from the unstructured textual news data:
the first machine learning model configured to receive the unstructured textual news data and trained to generate a vectorized representation of each document within the unstructured textual news data by structuring the vectorized representation with a term frequency and inverse document frequency (TF-IDF) value for each unique word within each document;
the first machine learning model trained with a mapping function interrelating vector representations and document descriptions, the first machine learning model configured to generate a document description of each document of the unstructured textual news data based on the mapping function and the generated vectorized representation;
the first machine learning model generating from the unstructured textual news data, with a pre-trained heuristic sentiment analyzer, a sentiment score for each document in the unstructured textual news data; and
the first machine learning model aggregating the sentiment score into an aggregated sentiment score for the unstructured textual news data relating to the entity; and
the second machine learning model having a trained dichotomy-marking function, the trained dichotomy-marking function trained to define one or more solution dichotomies within a plurality of dichotomies defined in part by document descriptions, aggregated sentiment scores, future feature values and future instance values, the second machine learning model configured to:
receive the aggregated sentiment score, the document description, the future feature value and the future instance value; and
determine whether the aggregated sentiment score, the document description, the future feature value and the future instance value map onto the one or more solution dichotomies; and
generating one or more future entity state data structures having the future entity states associated with the one or more solution dichotomies in response to determining the aggregated sentiment score, the document description, the future feature value and the future instance value map onto the one or more solution dichotomies.

* * * * *

UNITED STATES PATENT AND TRADEMARK OFFICE
CERTIFICATE OF CORRECTION

| | | |
|---|---|---|
| PATENT NO. | : 11,556,992 B2 | Page 1 of 1 |
| APPLICATION NO. | : 16/994518 | |
| DATED | : January 17, 2023 | |
| INVENTOR(S) | : Hieu Quoc Nguyen et al. | |

It is certified that error appears in the above-identified patent and that said Letters Patent is hereby corrected as shown below:

In the Claims

Column 38 Line 26 - 30 (Claim 2):
"determine the future feature value and the future instance value based on the updated updated second long term state representation and the second state representation and the second hidden state representation; and"

Should read:
-- determine the future feature value and the future instance value based on the updated second long term state representation and the second state representation and the second hidden state representation; and --

Column 38 Lines 32 - 37 (Claim 3):
"The system of claim 2, wherein the first RNN layer and the second RNN layer include 65 neurons, and are tuned with: a learning rate of 0.01, a Lambda l2 regularization parameter of 0.003 and a gradient clipping parameter of 2.5, an Adam optimization function, and a ReLu activation function."

Should read:
-- The system of claim 2, wherein the first RNN layer and the second RNN layer include 65 neurons, and are tuned with: a learning rate of 0.01, a Lambda l2 regularization parameter of 0.003 and a gradient clipping parameter of 2.5, an Adam optimization function, and a ReLu activation function. --

Signed and Sealed this
Twenty-sixth Day of August, 2025

Coke Morgan Stewart
*Acting Director of the United States Patent and Trademark Office*